INVENTORS
RICHARD BOUCHARD
PHILIP BILLINGS
RICHARD A. HORN
ATTORNEY

Jan. 21, 1969 R. BOUCHARD ET AL 3,423,626
CHARACTER GENERATOR
Filed Oct. 18, 1965 Sheet 2 of 14
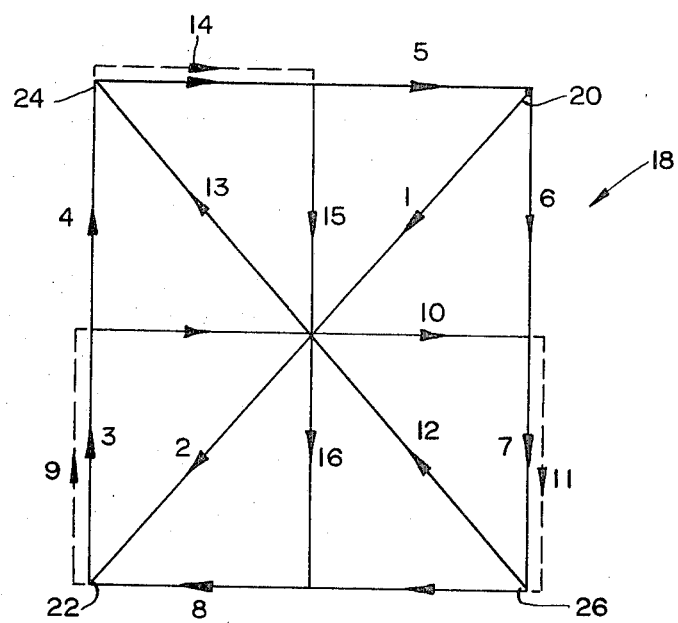
FIG. 2
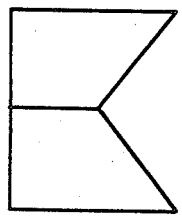
FIG.3A
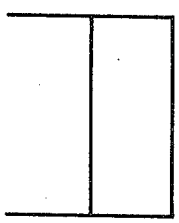
FIG.3B
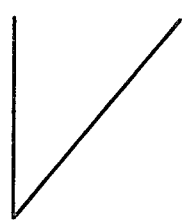
FIG.3C
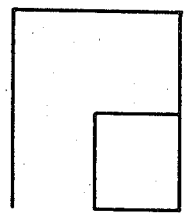
FIG.3D
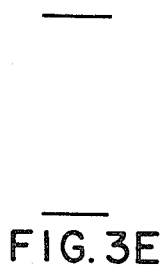
FIG.3E
FIG.3
INVENTORS
RICHARD BOUCHARD
PHILIP BILLINGS
RICHARD A. HORN
BY
ATTORNEY

INVENTORS
RICHARD BOUCHARD
PHILIP BILLINGS,
RICHARD A. HORN
ATTORNEY

INVENTORS
RICHARD BOUCHARD
PHILIP BILLINGS
RICHARD A. HORN

BY

ATTORNEY

United States Patent Office 3,423,626
Patented Jan. 21, 1969

3,423,626
CHARACTER GENERATOR
Richard Bouchard, Hudson, Philip Billings, Nashua, and Richard A. Horn, Hudson, N.H., assignors to Sanders Associates, Inc., Nashua, N.H., a corporation of Delaware
Filed Oct. 18, 1965, Ser. No. 497,197
U.S. Cl. 315—18                                         15 Claims
Int. Cl. H01j 29/70

ABSTRACT OF THE DISCLOSURE

A character generating apparatus produces a signal which deflects the beam of a picture tube type display device having a screen on which the deflectable beam forms a visible trace. The apparatus employs a capacitor and a charging circuit connected to the capacitor which charges the capacitor at a uniform rate dependent upon the amplitude of a control signal applied to the charging circuit. A control circuit applies a succession of control signals having different amplitudes to the charging circuit according to a preselected sequence and a deflection system deflects the beam in response to the voltage across the capacitor so as to trace a pattern of successively-formed strokes.

---

This invention relates to the art of displaying characters such as letters, numbers and other symbols on display devices of the picture-tube type. Display apparatus of this type is often used with data processing systems to provide a temporary display of information already stored in the data processing system, as well as of information being composed for storage in the system. For example, in an air-line reservation office, display apparatus embodying the invention can be used to show a reservation clerk the reservations already entered for a specified flight and to "print" a new reservation as she types it.

More particularly, the invention provides improvements in character-generating apparatus of the type that displays alphanumeric characters and other symbols by means of a deflectable beam impinging on a screen. The embodiment of the invention described below employs a cathode ray tube as the display medium.

The display apparatus of the invention produces signals for deflecting the beam to trace a pattern having all the strokes required to form every character that can be displayed. Simultaneously, a signal identifying the particular character to be displayed is processed to cause the display device to display only those strokes needed to form the character. By displaying all characters in this manner with a single character pattern, relatively few electronic circuits are required. Hence, the display apparatus can be assembled at relatively low cost and in a relatively small space.

A further feature of the invention concerns the circuits developing the deflection signals that cause the beam to trace the character pattern. Also, the signals for selecting which strokes are to be displayed are produced in a novel manner. The resultant deflection signals and stroke-selecting signals produce characters that are sharp and clear. Also, all the characters in a complete word or message are of uniform size.

An object of the invention is to provide relatively low cost character display apparatus that produces characters that are easy to read.

Another object of the invention is to provide such apparatus capable of displaying essentially all standard alphanumeric characters and symbols.

It is also an object of the invention to provide such apparatus that is readily capable of high speed operation.

Another object of the invention is to provide apparatus for displaying alphanumeric characters with continuous portions of each character being in unbroken form. This object is directed to a deficiency in many prior character-display systems wherein continuous portions of each character are displayed as a succession of dots or disconnected dashes.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which:

FIGURE 2 shows a preferred stroke pattern with which the illustrated equipment displays characters;

FIGURES 3a–3e illustrate several characters as formed according to the invention with the stroke pattern of FIGURE 2;

Considered briefly, the illustrated display system has two subsystems that operate in synchronism with each other. A deflection subsystem develops positioning voltages that move the beam of a display device to the position on the display screen where the next character is to be formed.

Each time it moves the beam to a new position on the screen, the deflection subsystem develops a pair of deflection voltages for deflecting the beam to trace, at that position, a pattern having all the strokes required to form all the characters the system is capable of displaying.

Simultaneously, an unblanking subsystem processes a set of signals identifying the character to be displayed and develops a succession of unblanking signals timed to turn the beam on only when the deflection subsystem produces the voltages for tracing the strokes needed to form the identified character.

These positioning and deflection voltages and the unblanking signals cause the display device to form the character on its screen in what appears to the human observer to be instantaneous action. In fact, the two subsystems are capable of operating faster than currently available display devices. However, a fairly low-cost system embodying the invention displays characters at a nominal rate of 40,000 characters per second.

Equally as important as the speed of the display is the fact that each character is formed with a continuous, i.e. unbroken, line. Moreover, the lines forming each character have essentially uniform intensity. As a result, the display is highly intelligible, even when the characters have relatively small size. This makes it possible for the characters to be displayed on the screen with relatively high density.

Figure 1:
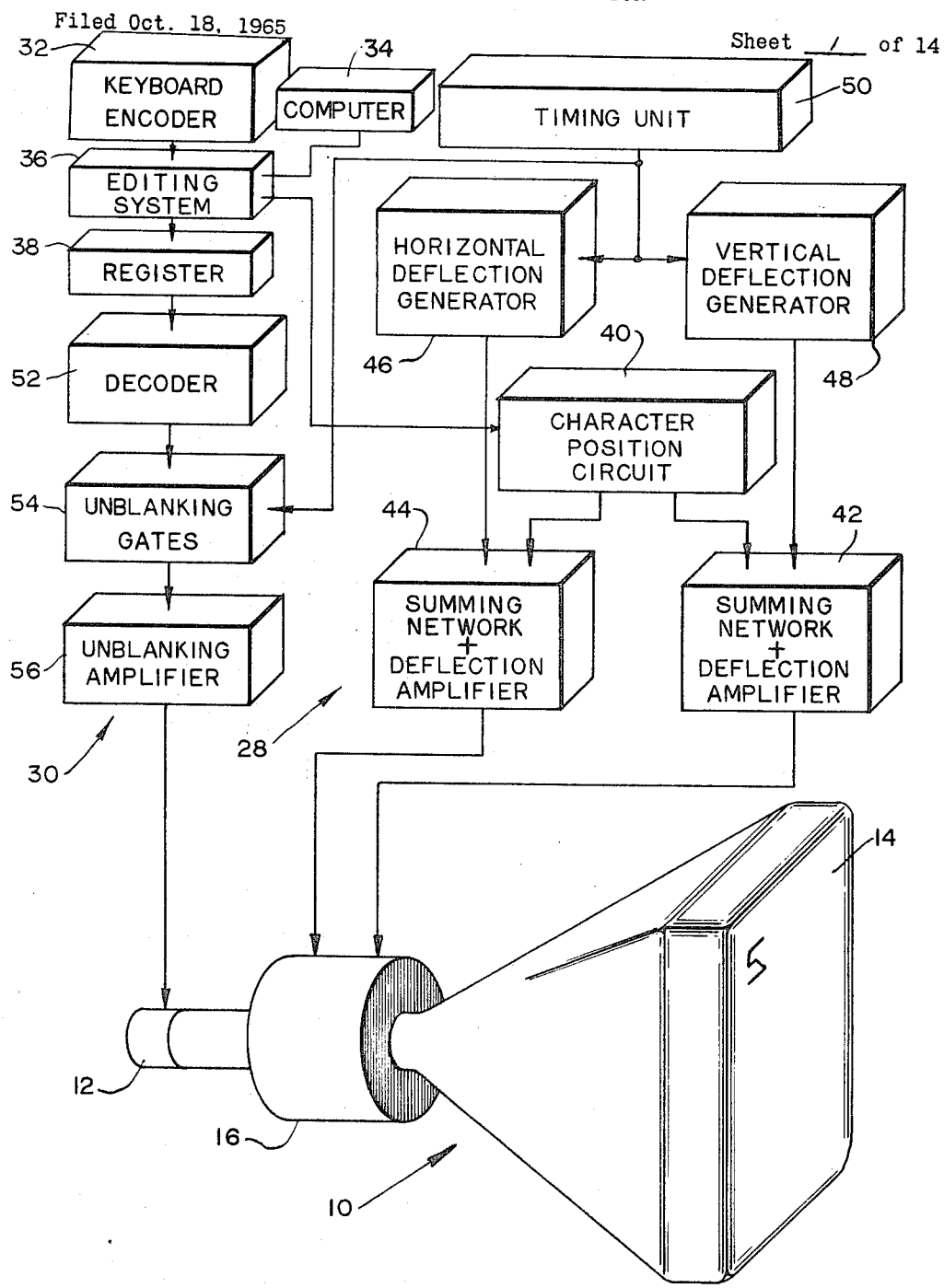
FIGURE 1 is a block diagram of a display system embodying the invention.

Turning to the drawings, the lower portion of FIGURE 1 shows a conventional cathode ray tube 10 having an electron gun 12 that projects a beam of electrons toward the screen 14 at the front of the tube. Visible light is produced on the screen wherever the beam impinges on it.

The tube 10 also has a deflector 16 between the gun 12 and the screen 14. The deflector moves the electron beam in the horizontal direction and in the vertical direction, with reference to the screen, in response to the deflection voltages applied to it. The electron gun 12 is normally blanked, i.e. the electron beam is normally turned off, so that no visible trace appears on the screen even though the deflection voltages are present. When an unblanking signal is applied to the electron gun, the display on the screen immediately commences at the point at which the beam impinges and continues along the path of subsequent beam deflection. The beam, and correspondingly the visible trace, immediately terminate when the unblanking signal terminates.

The display apparatus shown in FIGURE 1 above the cathode ray tube 10 develops voltages for deflecting the beam to trace a stroke pattern 18 shown in FIGURE 2. It also unblanks the cathode ray tube gun 12 to trace only the strokes of the pattern 18 that are needed to form the character in interest. The tube then displays this character, as illustrated by the number "5" shown on the screen in FIGURE 1.

Referring to FIGURE 2, the illustrated stroke pattern 18 is traced starting at the upper right corner 20. Strokes 1 and 2 are traced in succession to a diagonally opposite corner 22. The beam is then deflected straight up through strokes 3 and 4 to a corner 24 and then horizontally to the right back to the corner 20 with stroke 5. It is next deflected vertically downward through strokes 6 and 7 to a corner 26 of the pattern 18 and then horizontally to the left through stroke 8, returning to the corner 22. Stroke 9 repeats stroke 3 and moves the beam halfway between the corners 22 and 24. The beam is next deflected horizontally to the right with stroke 10 to the junction of strokes 6 and 7.

Stroke 11, which repeats stroke 7, then returns it to the lower right corner 26. From there, the beam is deflected simultaneously vertically upward and horizontally to the left through strokes 12 and 13 to the diagonally opposite corner 24. Stroke 14 repeats the first half of stroke 5 and is followed by strokes 15 and 16 in succession, which trace a vertical line parallel to and midway between the line formed by strokes 3 and 4 and the line formed by strokes 6 and 7.

The stroke pattern 18 is thus seen to consist of a rectangle with diagonals between the opposed corners 20 and 22, and 26 and 24. It also has lines between the midpoints of the four sides of the rectangle.

FIGURE 3 shows the form of several characters traced with the stroke pattern 18 of FIGURE 2. Referring first to FIGURE 3A, the letter B is displayed by unblanking the electron gun to turn the beam on only when the deflection voltages are present for tracing strokes 1, 3, 4, 5, 10F and 12. The stroke 10F is the first half of the stroke 10, i.e. it is the portion of stroke 10 extending between the junction of strokes 3 and 4 and the junction of strokes 15 and 16.

As shown in FIGURE 3B, the character system forms the letter D by displaying only strokes 5, 6, 7, 8, 15 and 16 of the pattern 18.

A further example of a letter formed with the stroke pattern 18 is shown in FIGURE 3C, where strokes 1, 2, 3 and 4 generate the letter V.

The stroke pattern 18 can also be used to form fairly accurate representations of many other symbols. This is illustrated in FIGURE 3D which shows the symbol @ as generated by unblanking the beam only for strokes 3, 4, 5, 6, 7, 8F, 10L and 16. Strokes 8F and 10L, respectively, are the first half of stroke 8 and the last half of stroke 10.

FIGURE 3E illustrates the use of quarter strokes of the stroke pattern 18 to generate the colon punctuation mark (:). With the illustrated apparatus, this is done with the third quarter of stroke 5 and the second quarter of stroke 8. However, other pairs of vertically in-line quarter strokes can also be used to form a colon.

Table I below lists the strokes of the pattern 18 used in generating each of the twenty-six letters of the alphabet and the ten decimal characters. Table II sets forth the strokes used in generating a variety of punctuation marks and symbols.

TABLE I.—CHARACTER GENERATOR UNBLANK STROKE PATTERN

| Character | Stroke | | | | | | | | | | | | |
|---|---|---|---|---|---|---|---|---|---|---|---|---|---|
| | 1 | 2 | 3 | 4 | 5 | 6 | 7 | 8 | 10 | 12 | 13 | 15 | 16 |
| A | | | X | X | X | X | X | | X | | | | |
| B | X | | X | X | X | | | X | F | X | | | |
| C | | | X | X | X | | | X | | | | | |
| D | | | | | X | X | X | X | L | | | X | X |
| E | | | X | X | X | | | X | F | | | | |
| F | | | X | X | X | | | | F | | | | |
| G | | | X | X | X | | X | X | L | | | | |
| H | | | X | X | | X | X | | X | | | | |
| I | | | | | X | | | X | | | | X | X |
| J | | X | | | X | X | X | | | | | | |
| K | X | | X | X | | | | | F | X | | | |
| L | | | X | X | | | | X | | | | | |
| M | X | | X | | X | X | | | | | X | | |

TABLE I—Continued

| Character | Stroke | | | | | | | | | | | | |
|---|---|---|---|---|---|---|---|---|---|---|---|---|---|
| | 1 | 2 | 3 | 4 | 5 | 6 | 7 | 8 | 10 | 12 | 13 | 15 | 16 |
| N | | | X | X | | X | X | | | X | X | | |
| O | | | X | X | X | X | X | X | | | | | |
| P | | | X | X | X | X | | | X | | | | |
| Q | | | X | X | X | X | X | X | | X | | | |
| R | | | X | X | X | X | | | X | X | | | |
| S | | | | X | X | | X | X | X | | | | |
| T | | | | | X | | | | | | | X | X |
| U | | | X | X | | X | X | X | | | | | |
| V | X | X | X | X | | | | | | | | | |
| W | | X | X | X | | X | X | | X | | | | |
| X | X | X | | | | | | | | X | X | | |
| Y | X | X | | | | | | | | | X | | |
| Z | X | X | | | X | | | X | X | | | | |
| 0 | X | X | X | X | X | X | X | X | | | | | |
| 1 | | | | | | | | | | | | X | X |
| 2 | | | X | | X | X | | X | X | | | | |
| 3 | X | | | | X | | X | X | L | | | | |
| 4 | | | | X | | X | X | | X | | | | |
| 5 | | | | X | X | | | X | F | X | | | |
| 6 | | | X | X | X | | X | X | X | | | | |
| 7 | X | X | | | X | | | | | | | | |
| 8 | | X | X | X | X | X | X | X | | | | | |
| 9 | | | | X | X | X | X | X | X | | | | |

TABLE II

| Character | Stroke | | | | | | | | | | | | |
|---|---|---|---|---|---|---|---|---|---|---|---|---|---|
| | 1 | 2 | 3 | 4 | 5 | 6 | 7 | 8 | 10 | 12 | 13 | 15 | 16 |
| ! | | | | | | | | | | | | X | L |
| " | | | | X | | X | | | | | | | |
| @ | | | X | X | X | X | X | F | L | | | | X |
| $ | | | | X | X | | X | X | X | | | X | X |
| % | X | X | | X | F | | X | F | X | | | X | X |
| & | X | X | | | X | | X | X | | X | X | | |
| ' | | | | | | | | | | | | X | |
| [( | | | X | X | F | | | L | | | | | |
| ]) | | | | | L | X | X | F | | | | | |
| × | X | X | | | | | | | | X | X | X | |
| + | | | | | | | | | X | | | L | F |
| , | | | | | | | X | | L | | | | |
| - | | | | | | | | | X | | | | |
| . | | | | | | | | | QZ | | | | |
| : (middle dot) | | | | | | | | QZ | | | | | |
| / | X | X | | | | | | | | | | | |
| : | | | | | QZ | | | QZ | | | | | |
| ; | | | | | QZ | | L | | L | | | | |
| < | X | | | | | | | | | X | | | |
| = | | | | | | | | X | X | | | | |
| > | | X | | | | | | | | | X | | |
| ? | | | | | X | X | | | L | | | | X |
| \ | | | | | | | | | | X | X | | |
| ↑ | | F | | | | | | | | | L | | X |
| ← | L | | | | | | | | L | L | | | |

QZ=Second Quarter of Stroke.

Referring again to FIGURE 1, in addition to the cathode ray tube 10 or other deflectable-beam display device, the illustrated display system has a deflection subsystem 28 that generates the signals for causing the cathode ray tube deflector 16 to position the electron beam at the location on the screen where a character is to be formed and to deflect the beam at that position through all the strokes of the FIGURE 2 pattern 18.

Also, an unblanking subsystem 30 receives a set of coded signals identifying the character to be displayed and generates the unblanking signals that turn the beam on at the precise times the tube receives the deflection signals for the strokes needed to form the character. Illustratively, the unblanking subsystem receives the character-identifying signals from either a keyboard encoder 32 or from a computer 34. A keyboard encoder is a typewriter-like device that develops coded electrical signals corresponding to the characters assigned to the keyboard buttons the operator depresses. The computer 34, on the other hand, can produce the signals in response to an instruction so that it transmits to the unblanking subsystem 30 the information stored at a specified address within the memory element of the computer.

As also shown in FIGURE 1, the keyboard encoder and the computer apply the character-identifying signals to an editing unit 36. This device applies the character-identifying signals to a register 38.

The editing unit 36 also produces signals for positioning the electron beam at the location on the screen 14 where the character is to be displayed. The illustrated editing unit develops these signals with two counters; their operation can be understood by considering the cathode ray tube screen 14 as a page with "lines" at which the characters can be formed. One counter in the editing unit 36 is accordingly set to the number identifying the "line" in which the character is to be displayed. The other counter in the editing unit is set to the number identifying the location or space along the identified line.

The contents of the counters are applied to digital-to-analog converters in a character-position circuit 40. The output from one converter is a signal whose amplitude corresponds to the vertical deflection signal needed to position the beam in the selected line. The other analog signal corresponds to the horizontal deflection signal needed to position the beam to the space in which the character is to be displayed.

As also shown in FIGURE 1, a horizontal deflection generator 46 in the subsystem 28 develops the signals for deflecting the beam back and forth in the horizontal direction as required to trace the stroke pattern 18 in FIGURE 2 in the "line" and "space" at which the beam is positioned. These signals are applied to a horizontal summing network and deflection amplifier 44, which adds them to the horizontal positioning signal from the character position circuit 40, and then amplifies the combined signal before applying it to the cathode ray tube deflector 16.

Similarly, a vertical deflection generator 48 develops the signals for deflecting the beam up and down as required in the stroke pattern in FIGURE 2. The vertical deflection signals are applied together with the vertical position signal to a vertical summing network and deflection amplifier 42 that applies the amplified combination of these signals to the deflector 16.

The deflection generators 46 and 48 develop the deflection voltages in response to timing signals from a timing unit 50. More specifically, recalling that the FIGURE 2 stroke pattern 18 comprises sixteen strokes, the horizontal and vertical deflection signals are generated in sixteen successive time intervals measured by the timing unit 50. During each of these time intervals, one or both of the deflection generators 46, 48 produce signals for deflecting the beam to trace a specific stroke of the pattern.

In the unblanking subsystem 30, a decoder 52 and an unblanking encoder 54 form a code converter that converts the parallel set of character-identifying signals in the register 38 to a serial set of unblanking signals that identify the same character according to a different code. More particularly, the coded signals from the illustrated register 38 represent binary digits on individual conductors. The unblanking signal from the encoder 54, on the other hand, consists of a succession of pulses on a single conductor; the time sequence of these pulses correspond to the selected character.

The first step in this code conversion is achieved with the decoder 52, which has a different output terminal for each character that the system can display. The decoder energizes the one output terminal associated with the character contained in the register 38.

The unblanking encoder 54, which connects to the decoder output terminals, develops a separate stroke signal for each stroke required to form the selected character. The encoder 54 then gates the stroke signals with a succession of timing signals from the timing unit 50. This operation produces unblanking signals synchronized with the deflection voltages so that the unblanking signal for each stroke in the stroke pattern for the selected character (e.g. see FIGURE 3) is produced at exactly the time the deflection generators 46 and 48 are producing the voltages to deflect the beam to trace that stroke. In other words, the encoder 54 emits a single train of timed pulses that, when applied to the electron gun 12, turn the beam on at the proper times to display the strokes for forming the selected character.

An amplifier 56 in the unblanking subsystem 30 applies the unblanking signals to the electron gun of the cathode ray tube.

*Timing unit*

Figure 4:
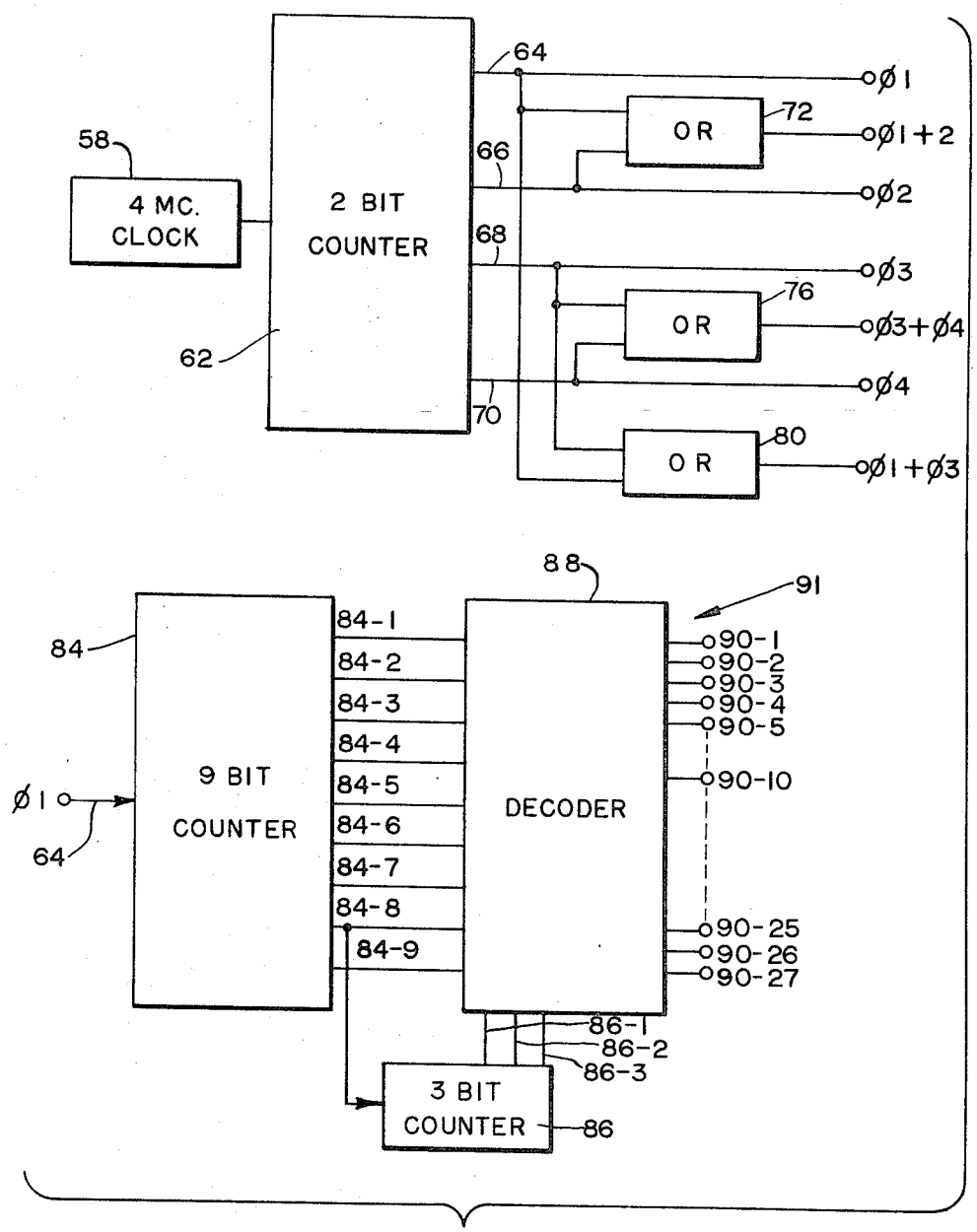
FIGURE 4 shows the timing circuits in the timing unit of FIGURE 1.

As shown in FIGURE 4, an illustrative timing unit 50 of FIGURE 1 has a four-megacycle clock 58, i.e., a source of a precisely-timed periodic signal having a period of one-quarter microsecond. The curve 60 in FIGURE 5A, which is a graph of voltage as a function of time, depicts this signal.

The timing signal from the clock 58 is applied to a binary counter 62 having two bistable circuits. The counter cycles through four stages and delivers an output on one of four output lines 64, 66, 68 and 70 depending on which state it is in. The output on each line thus takes the form of one quarter-microsecond pulse every microsecond. These pulses are shown in FIGURES 5B through 5E with the waveforms 64a, 66a, 68a and 70a. For subsequent reference, the timing signal developed on the counter output line 64 is referred to as a phase one ($\phi 1$) timing signal and the timing signals developed on the counter output lines 66, 68 and 70 are respectively referred to as phase two ($\phi 2$), phase three ($\phi 3$) and phase four ($\phi 4$) timing signals.

Figure 5:
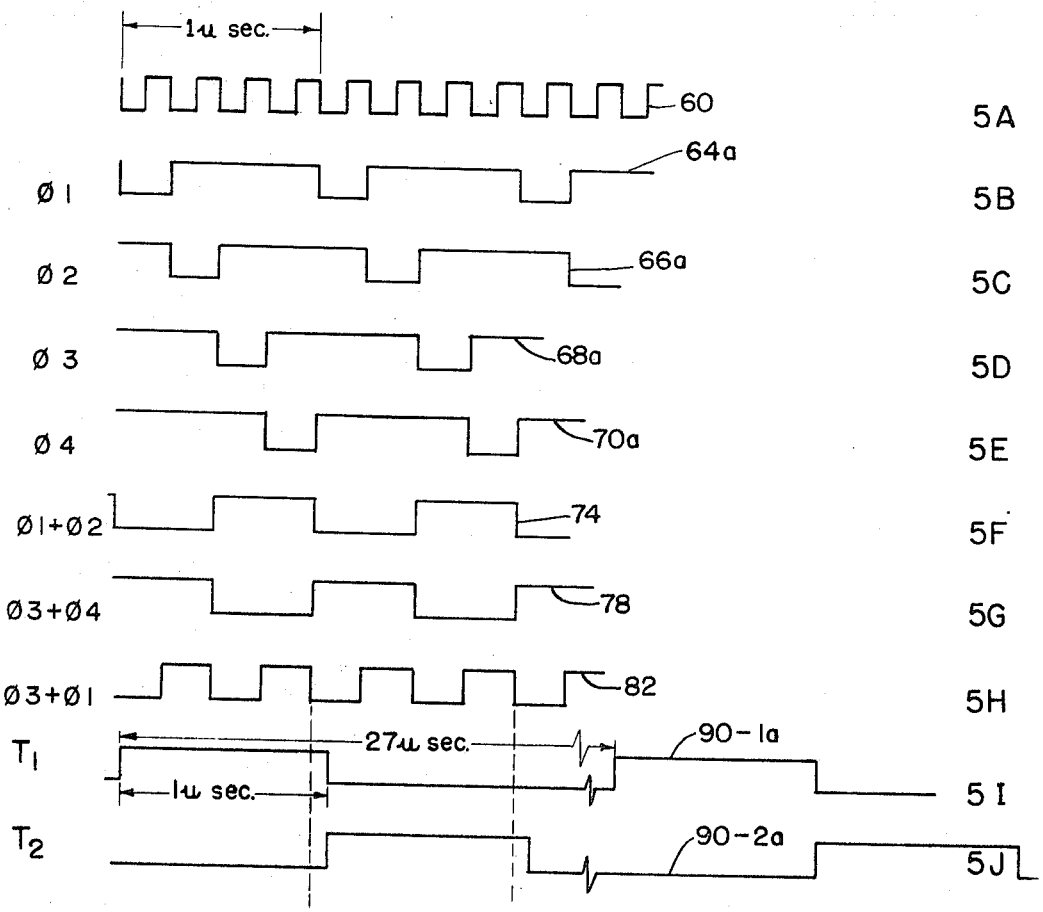
FIGURE 5 shows the timing signals developed with the timing circuits of FIGURE 4.

With further reference to FIGURES 4 and 5, an OR circuit 72 sums the ($\phi 1$) and ($\phi 2$) timing signals and thus develops an output signal when a timing signal is present on either of the lines 64 or 66. The waveform of this ($\phi 1 + \phi 2$) signal is shown in FIGURE 5F with the curve 74 and is seen to consist of a train of half-microsecond pulses with each pulse being present during the first half of each one-microsecond period required to cycle the counter 62.

Similarly, an OR circuit 76 develops a ($\phi 3 + \phi 4$) signal having the waveform shown in FIGURE 5G with the curve 78.

A ($\phi 3 + \phi 1$) timing signal is developed with an OR circuit 80 connected to the counter output line 64 and 68. The curve 82 in FIGURE 5H depicts the ($\phi 3 + \phi 1$) signal, which consists of quarter-microsecond pulses spaced a quarter-microsecond apart.

The timing unit 50 of FIGURE 1 also includes a nine-bit counter 84, FIGURE 4, having nine output lines 84–1, 84–2 . . . 84–9. The input line of the nine-bit counter is the ($\phi 1$) timing signal. The nine-bit counter thus develops a one microsecond signal on each output line every nine microseconds.

The timing signal developed on the output line 84–8 of the counter 84 is applied to a three-bit counter 86 having three output lines 86–1, 86–2, 86–3. Each of these lines has a signal for one cycle out of every three of the nine-bit counter 84, or for nine microseconds out of every 27 microseconds.

The output lines from the counters 84 and 86 are applied to a decoder or matrix switch 88 having 27 output lines 90–1, 90–2 . . . 90–27. The matrix switch 88 combines each of the nine counts from counter 84 with the signals from the three-bit counter 86 to develop 27 successive one microsecond pulses, each of which is developed on a dijerent output line 90–1 through 90–27. The curve 90–1a in FIGURE 5I shows the waveform of the timing pulse $T_1$ developed on the output line 90–1, and the curve 90–2a in FIGURE 5J shows the timing pulse $T_2$ developed on the number 2 output line from the matrix switch. Due to the switching time of the counters 84 and 86 and of the matrix switch 88, these timing pulses begin and end shortly after the negative transitions at the leading edge of the corresponding ($\phi 1$) timing pulses. These timing pulses of FIGURES 5I and 5J are typical of those developed on the remaining output lines 90.

Deflection subsystem

Figure 6:
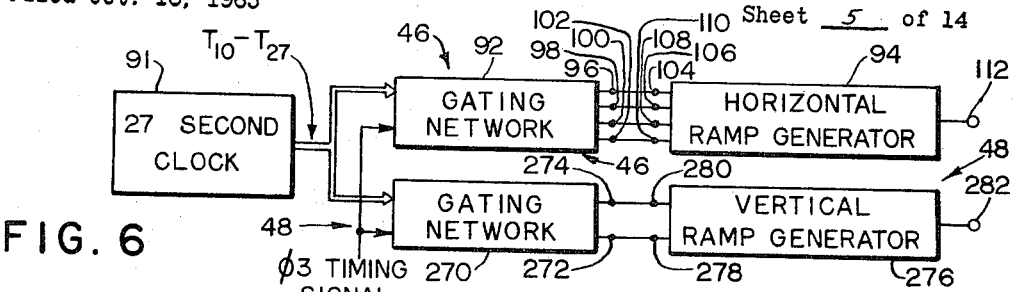
FIGURE 6 is a schematic representation of the character generators of FIGURE 1.

As shown in FIGURE 6, the horizontal deflection generator 46 comprises a gating network 92 and a ramp generator 94. The network 92 receives the timing pulses $T_{10}$–$T_{27}$ and combines these pulses with ($\phi 3$) synchronizing pulses to provide timing signals at output terminals 96, 98, 100 and 102. A conventional arrangement of a flip-flop register and coincidence circuits can be used to provide this function, therefore the circuit need not be detailed here. It should be noted, however, that switching in the network 92 essentially coincides with the leading (negative going) edges of ($\phi 3$) synchronizing pulses; as shown in FIGURE 5, this occurs at the middle of the timing pulses.

Figure 7:
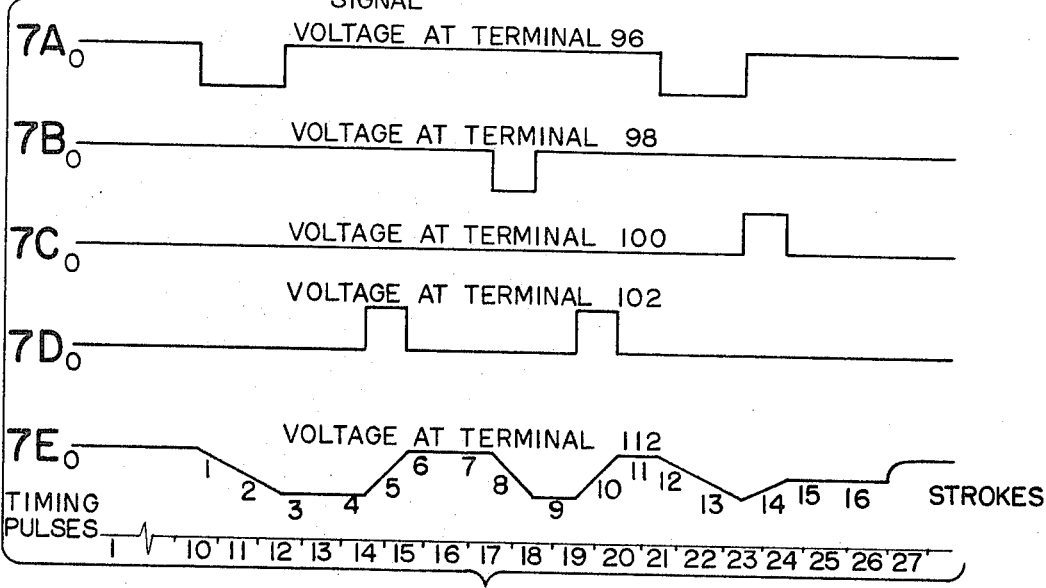
FIGURES 7a–7e show graphs of several voltages plotted as a function of time, illustrating the operation of the horizontal deflection generator of FIGURE 6.

The outputs of the gating network 92 are depicted in the graphs of FIGURES 7A, 7B, 7C and 7D as a function of the timing pulses from the clock 91. During timing pulses 1 through 9, all the output voltages are zero. As shown in FIGURE 7A, the voltage at the output terminal 96 goes negative at the middle of the $T_{10}$ pulse. At the middle of the $T_{12}$ pulse it returns to zero. The voltage at terminal 96 again goes negative for two microseconds between the middle of $T_{21}$ and the middle of $T_{23}$. The voltage at terminal 98, shown in the FIGURE 7B, is zero throughout each cycle of the clock 91 except for the one microsecond interval from the middle of $T_{17}$ to the middle of $T_{18}$, when it assumes a negative value.

The voltage at terminal 100, shown in FIGURE 7C, has a positive value from the middle of $T_{23}$ to the middle of $T_{24}$. Otherwise it is at ground potential.

FIGURE 7D shows the voltage at the output terminal 102. It goes positive during $T_{14}$ and returns to zero during $T_{15}$. It has the same positive value for one microsecond starting at the middle of $T_{19}$.

As also shown in FIGURE 6, these voltages which the gating network 92 develops at its output terminals 96, 98, 100 and 102 are applied to input terminals 104, 106, 108 and 110, respectively, of the ramp generator 94. The ramp generator produces at its output terminal 112 the signal shown in FIGURE 7E.

For example, in response to the negative voltage (FIGURE 7A) it receives at its terminal 104, the ramp generator produces a negative ramp voltage having a one-unit slope. In each cycle of the FIGURE 4 clock 91, this occurs first during the two microsecond interval between the middle of $T_{10}$ and the middle of $T_{12}$.

As designated on the waveform in FIGURE 7E, this portion of the horizontal deflection voltage is used to trace strokes 1 and 2 of the FIGURE 2 stroke pattern 18.

More specifically, the voltages shown in FIGURE 7E correspond to the horizontal position of the beam during generation of the stroke pattern and changes in voltage correspond to horizontal beam motion during pattern generation.

The same negative slope occurs when strokes 13 and 14 are being formed.

During the tracing of strokes 3 and 4, which occurs from the middle of timing pulse $T_{12}$ to the middle of timing pulse $T_{14}$, all the input voltages to the horizontal ramp generator are zero. Accordingly, its output voltage remains unchanged. This is consonant with the stroke pattern, because strokes 3 and 4 involve only vertical movement of the beam.

The ramp generator 94 produces a positive ramp voltage of two units slope in response to the positive voltage (FIGURE 7D) applied to its terminal 110 during the one microsecond interval from the middle of pulse $T_{14}$ to the middle of pulse $T_{15}$. This horizontal deflection voltage is used to trace stroke 5. It will now be seen that to deflect the beam to trace a stroke such as stroke 1 from right to left halfway across the stroke pattern, the horizontal deflection generator produces a negative ramp voltage of one unit slope. A positive ramp voltage having twice the slope, on the other hand, is generated to deflect the beam for tracing stroke 5 from left to right the full width of the FIGURE 2 stroke pattern.

With further reference to FIGURE 7E, the horizontal ramp generator input voltage is zero from the middle of $T_{15}$ to the middle of $T_{17}$. Accordingly, the horizontal deflection voltage produced at its output terminal 112 remains constant while vertical strokes 6 and 7 are being traced.

From the middle of $T_{17}$ to the middle of $T_{18}$, the ramp generator receives the negative voltage (FIGURE 7B) developed at the gate circuit terminal 98. In response, it produces a negative ramp voltage of two units slope. Stroke 8, which traverses the full width of the stroke pattern, is produced with this horizontal deflection voltage.

At the middle of $T_{19}$ the ramp generator receives a positive voltage (FIGURE 7D) at its input terminal 110. In response it produces a positive ramp voltage of two units slope for one microsecond to trace stroke 10.

In the interval from the middle of $T_{20}$ to the middle of $T_{21}$, the gate circuit output voltage is zero and the resultant horizontal deflection voltage remains fixed. During this interval the cathode ray tube beam is moved in the vertical direction to trace stroke 11. Next, in response to the voltage (FIGURE 7A) received at the ramp generator terminal 104, a negative ramp voltage of one unit slope is produced for two microseconds, until the middle of $T_{23}$, to provide horizontal beam deflection during strokes 12 and 13.

The positive voltage (FIGURE 7C) applied to the ramp generator terminal 108 produces a positive ramp voltage of one unit slope from the middle of $T_{23}$ to the middle of $T_{24}$. This horizontal deflection voltage is used to trace stroke 14 from left to right halfway across the stroke pattern. No further voltages are applied to the ramp generator during the balance of the clock 91 timing cycle. Hence, the horizontal deflection voltage remains fixed while vertical strokes 15 and 16 are being traced. As will be described with reference to FIGURE 8, the $T_{27}$ pulse causes the ramp generator output voltage to return to zero.

The ramp generator 94 can be constructed with four separate ramp generating circuits having their output voltages combined to produce the single ramp waveform shown in FIGURE 7E. However, it is often difficult to "harmonize" the separate circuits to provide highly uniform ramp voltages that produce well-formed and easy-to-read characters. The ramp generator of FIGURE 8, on the other hand, is well-suited to achieve this result. The ramp generator input terminals 104, 106, 108 and 110 that connect to the gating network 92 (FIGURE 6) are shown at the left side of FIGURE 8 and the output terminal 112 is at the right side.

As shown in this drawing, the preferred ramp generator produces the horizontal deflection voltage by charging a single capacitor 114 with current whose polarity corresponds to the polarity of the input voltage from the gating network 92. Thus, the positive voltages of FIGURES 7C and 7D, applied to the input terminals 108 and 110 respectively, cause the capacitor 114 to be charged from a positive constant current source 116. A negative constant current source 118 charges the capacitor 114 in the opposite direction when the ramp generator receives the negative voltages of FIGURES 7A and 7B, applied to its input terminals 104 and 106. As will now be described, the rate at which each of the sources 116 and 118 charges the capacitor depends on which of the two input terminals associated with it is being activated.

The voltage across the capacitor 114 is applied to the output terminal 112 through a double emitter follower indicated generally at 120. This circuit presents a high impedance to the capacitor essentially independent of the loading at the output terminal 112.

The ramp generator 94 is also provided with a discharge switch indicated generally at 122. The switch is operated by the $T_{27}$ pulse to discharge the capacitor 114 at the end of every 27-microsecond cycle of the FIGURE 4 clock 91.

More particularly, a resistor 124 is connected between input terminal 110 and the base 126 of a switching transistor 128. The transistor emitter 130 is connected to ground. An adjustable resistor 132 consisting of a fixed resistor 134 in parallel with a trimmer resistor 136 connects the transistor collector 138 to the base 140 of a transistor 142 in the constant current source 116.

Figure 8:
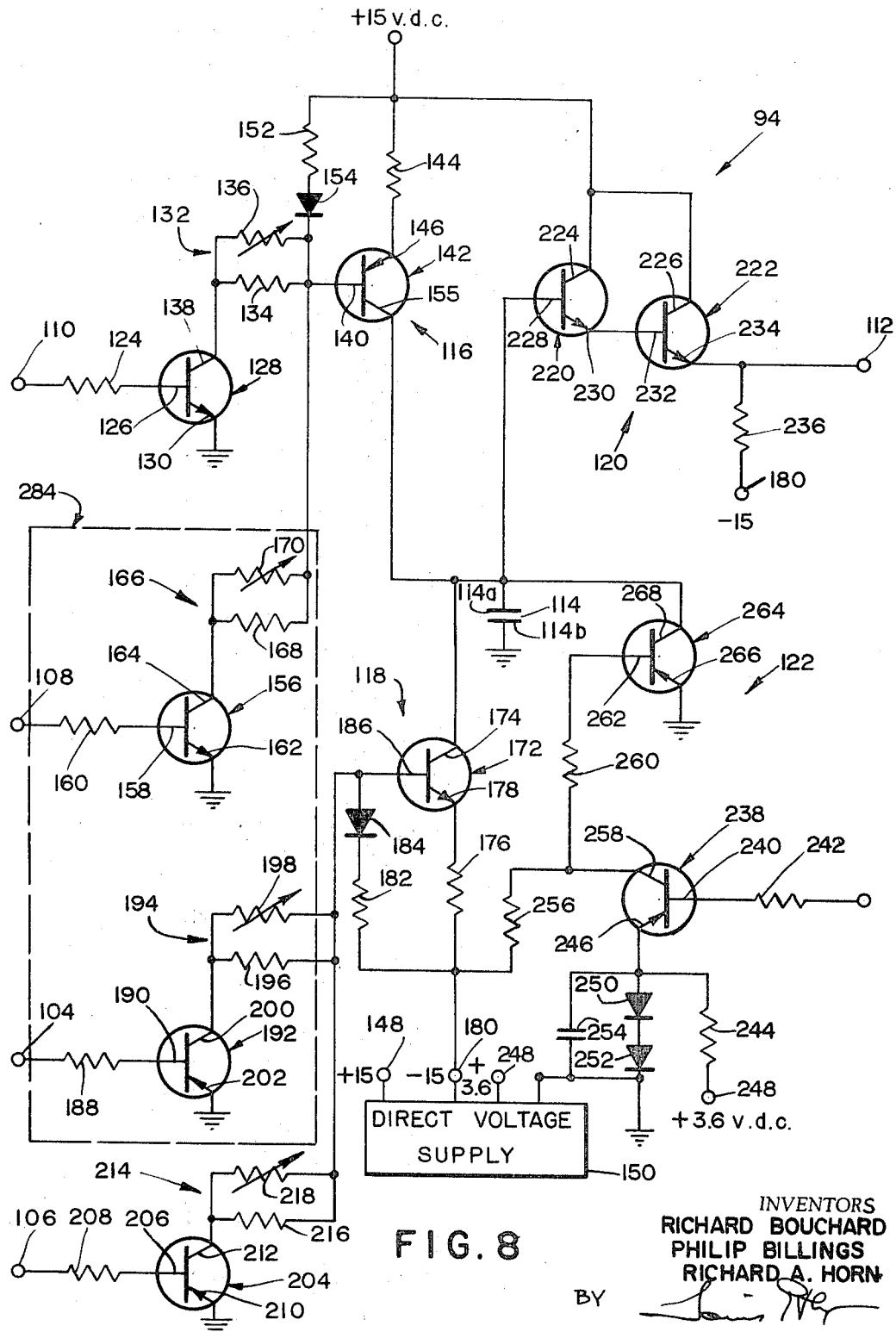
FIGURE 8 is a schematic diagram of the ramp generator used in the horizontal deflection generator of FIGURE 6.

As also shown in FIGURE 8, a resistor 144 connects the emitter 146 of the transistor 142 to a positive terminal 148 of a supply 150 of direct voltage. The illustrated supply develops 15 volts at the terminal 148 with respect to ground. A resistor 152 is connected in series with a diode 154 between the supply terminal 148 and the base 140 of the transistor 142. The transistor 142 and diode 154 are of the same material, e.g. silicon. Thus, the temperature-dependent variations in the forward resistance of the diode compensate for temperature-dependent changes in the forward resistance of the emitter-base junction of the transistor.

The collector 155 of the transistor 142 is connected to one plate 114a of the capacitor 114; the other capacitor plate 114b is connected to ground.

The ramp generator 94 also has a switching transistor 156 whose base 158 is connected through a resistor 160 to the input terminal 108. The transistor emitter 162 is grounded and the collector 164 is connected through an adjustable resistor 166, consisting of a fixed resistor 168 in parallel with a trimmer resistor 170, to the base 140 of the constant current source transistor 142.

The source 118 of constant negative current is essentially identical to the positive current source 116 except that it uses an NPN transistor 172, whereas the transistor 142 is of the PNP type. The collector 174 of transistor 172 is connected to the capacitor plate 114a and a resistor 176 is connected between the transistor emitter 178 and a terminal 180 at which the supply 150 develops a negative voltage, illustratively minus 15 volts.

The series combination of a resistor 182 and a compensating diode 184 is connected between the base 186 of the transistor 172 and the power supply terminal 180.

The ramp generator input terminal 104 is connected through a resistor 188 to the base 190 of a switching transistor 192. An adjustable resistor 194 consisting of a fixed resistor 196 in parallel with a trimmer resistor 198 connects the transistor collector 200 to the base 186 of the current source transistor 172. The emitter 202 of the transistor 192 is connected to ground.

As also shown in FIGURE 8, a switching transistor 204 has its base 206 connected to a resistor 208 that is connected at its other end to the ramp generator input terminal 106. The transistor emitter 210 is connected to ground and its collector 212 is connected to the base 186 of the transistor 172 through an adjustable resistor 214 formed with a fixed resistor 216 in parallel with a trimmer resistor 218.

The double emitter follower circuit 120 in the ramp generator 94 comprises transistors 220 and 222 having their collectors 224 and 226, respectively, connected to the terminal 148 of the supply 150. The base 228 of the transistor 220 is connected to the capacitor plate 114a and the emitter of this transistor 230 is connected to the base 232 of the transistor 222. The emitter 234 of transistor 222 is connected to the ramp generator output terminal 112 and to one end of a resistor 236 whose other end is connected to the supply terminal 180.

In the capacitor discharge switch 122, a transistor 238 receives the $T_{27}$ pulse at its base 240 through a resistor 242. A resistor 244 connects the transistor emitter 246 to a terminal 248 at which the supply 150 develops a positive voltage smaller than the plus 15 volts developed at the terminal 148; the illustrated supply develops 3.6 volts at the terminal 248.

Two diodes 250 and 252 are in series between the transistor emitter 246 and ground. These diodes operate as a voltage regulator maintaining a small forward bias across the emitter-base junction of transistor 238 in the absence of the $T_{27}$ pulse. A bypass capacitor 254 is in parallel with the diodes. A resistor 256 is connected between the negative supply terminal 180 and the collector 258 of the transistor 238. A resistor 260 connects the collector 258 to the base 262 of a transistor 264. The emitter 266 of this transistor is connected to ground and its collector 268 is connected to the capacitor plate 114a.

As shown in FIGURES 7A through 7D, during the first nine timing pulses from the FIGURE 4 clock 91, the output voltages at the gating network terminals 96–102 are zero. Correspondingly, the input voltages at the terminals 104–110 of the horizontal ramp generator are zero. The emitter of each switching transistor 128, 156, 192 and 204, being connected to ground, is therefore at essentially the same voltage as its base. Accordingly, each switching transistor is OFF, and has a high resistance between its collector and emitter. The base and emitter of each current source transistor 142 and 172 are likewise at substantially the same voltage. Hence these transistors are also OFF, and no current is delivered to the capacitor 114.

When the gating network 92, FIGURE 6, applies the negative voltage shown in FIGURE 7A to the input terminal 104 of the ramp generator, as occurs for example, from the middle of $T_{10}$ to the middle of $T_{12}$ the emitter-base junction of transistor 192 becomes forward biased. The transistor is therefore turned ON and has a very low resistance between its collector and emitter.

This low transistor resistance and the resistors 176, 182 and 194 form a voltage divider between the negative supply terminal 180 and ground when the transistor 172 is cut off. The base 186 of the transistor 172, connected to the interconnection of the resistors 182 and 194 hence receives a negative voltage determined in part by the value of the resistor 194. This base voltage is less negative than the voltage of the emitter 178 and hence the transistor 172 conducts negative current from the supply 150 through the collector 174 to the capacitor 114. The amplitude of the current depends on the voltage at the transistor base 186. Over the range of operation it is essentially independent of the voltage on the capacitor 114.

Accordingly, the current source 118 charges the capacitor 114 to an increasingly negative voltage. The emitter follower stage 120 applies this voltage to the output terminal 112. In this manner, the ramp generator develops the negative ramp voltage having a one-unit slope. This horizontal deflection voltage is shown in FIGURE 7E starting at the middle of $T_{10}$ and again at the middle of $T_{12}$.

When the transistor 172 conducts, the transistor 142 of the positive current source 116 presents a high impedance to the capacitor 114 so that essentially no charge applied to the capacitor from the current source 118 leaks off through the transistor 142. This is also true for the transistor 264 in the discharge switch 122; throughout timing pulses 1–26 of each cycle it is biased OFF and presents a high impedance to the capacitor 144. Since the emitter follower transistors 220 and 222 also present a relatively high impedance to the capacitor 114, the charge on the capacitor 114 is essentially unaffected by the loading at the ramp generator output terminal 112.

When the negative voltage applied to the ramp generator terminal 104 terminates, the switching transistor 192 turns OFF and develops an essentially open circuit between its collector 200 and emitter 202. The voltage at the base 186 of the current source transistor 172 therefore assumes substantially the same negative value as the emitter 178 and this transistor also stops conducting. Accordingly, the voltage across the capacitor 114 remains substantially constant, a condition illustrated in FIGURE 7E in the interval between the middle of $T_{12}$ and the middle of $T_{14}$.

As shown in FIGURE 7D, the gating network 92 next applies a positive voltage to the ramp generator input terminal 110 for one microsecond starting at the middle of $T_{14}$. This voltage switches the transistor 128 ON and the resulting drop across the resistor 152 reduces the voltage at the base 140 of transistor 142 to below the voltage at the emitter 146. Accordingly, the transistor 142 conducts and charges the capacitor 114 with positive current at a rate determined by the values of the resistors 144, 152 and 132.

The value of the resistor 132 is such that when the switching transistor 128 is ON, the transistor 142 in the source 116 conducts twice as much current as the transistor 172 in the source 118 did when the switching transistor 192 was ON. As a result, when the switching transistor 128 is ON, the capacitor 114 is charged to develop the positive ramp voltage of two units slope, whereas when the switching transistor 192 is ON, the capacitor is charged in the opposite direction and at half the rate to produce the negative ramp voltage of one unit slope. This is illustrated in FIGURE 7E, wherein the interval between the middle of $T_{14}$ and the middle of $T_{15}$ the ramp voltage output from the generator 94 increases at twice the rate at which it decreased during the interval between the middle of $T_{10}$ and the middle of $T_{12}$.

With further reference to FIGURE 8, the ramp generator terminal 106 receives the voltage shown in FIGURE 7B. When this voltage becomes negative, the switching transistor 204 is turned ON. This biases the emitter-base junction of the current source transistor 172. The source 118 accordingly charges the capacitor in the negative direction. The resistance of the resistor 214 is less than that of the resistor 194 associated with the switching transistor 192 by an amount sufficient to cause the current source 118 to charge the capacitor 114 negative at twice the rate it did when the transistor 192 was on. Accordingly, when the switching transistor 204 is ON, the ramp generator develops the negative ramp deflection voltage having the two-unit slope.

Similarly, when the voltage (FIGURE 7C) applied to the ramp generator terminal 108 goes positive, the switching transistor 156 is turned ON and the transistor 142 in the current source 116 becomes biased to charge the capacitor 114 in the positive direction. The resistor 166 is sufficiently larger than the resistor 132 associated with switching transistor 128 that the current source 116 now charges the capacitor at a rate corresponding to the one-unit slope. This operation of the ramp generator 94 is illustrated in FIGURE 7D in the interval between the middle of $T_{23}$ and the middle of $T_{24}$.

Thus, the horizontal ramp generator 94 develops the horizontal deflection voltage shown in FIGURE 7E with a single capacitor 114 that is charged alternately by sources of negative and positive current. Each current source is capable of charging the transistor at different rates according to the bias voltage developed at the base of the current source transistor. By thus using a single capacitor, and the conduction paths through only two transistors, i.e. the two current source transistors 142 and 172, to develop the four ramp voltages for horizontal deflection, the requisite slopes for the ramp voltages are relatively easily attained. The FIGURE 8 ramp generator achieves this result with fewer parts than would be required for four separate ramp generators. Moreover, there are fewer component aging problems than there would be with separate generators.

A further feature of the illustrated horizontal deflection system is that with the single capacitor 114 developing all the horizontal deflection voltages, there are no discontinuities in the ramp generator output voltage at the transition between the different ramps. Such discontinuities, which may be present when different capacitors are charged to develop the different ramp voltages, would degrade the quality of the resultant character formed on the screen of the display device.

Turning now to the operation of the capacitor discharge switch 122 in FIGURE 8, during the first 26 microseconds of each cycle of the FIGURE 4 clock 91, the output line 90–27 of the clock is at ground potential. Accordingly, the base 240 of the transistor 238 is at ground. The emitter 246 of the transistor, however, is clamped at a small positive voltage, illustratively 1.2 volts, by the action of the diodes 250–252 and the resistor 244 connected to the positive supply voltage at the terminal 248. Accordingly, the transistor 238 is ON and its collector 258 is at essentially the same positive voltage as the emitter 246. The resistor 260 applies this positive voltage to the base 262 of the transistor 264, thereby biasing that transistor OFF. Thus, during each 26-microsecond interval in which the horizontal deflection voltage of FIGURE 7E is being generated, the transistor 264 has a large impedance between its collector 268, connected to the capacitor plate 114a, and its grounded emitter 266.

The timing pulse $T_{27}$, which has a waveform identical to those shown in FIGURES 5I and 5J, drives the base of transistor 238 positive, thereby turning the transistor OFF. The resistors 256 and 260 then apply a substantial negative voltage from the direct voltage supply terminal 180 to the base 262 of the transistor 264. This turns the transistor 264 fully ON, so that there is a low resistance path between its collector 268 and the grounded emitter 266. The capacitor 114 discharges through this path of the transistor 264, as indicated at the right end of FIGURE 7E. The discharge operation is substantially completed within the one-microsecond interval during which $T_{27}$ is present.

Figure 9:
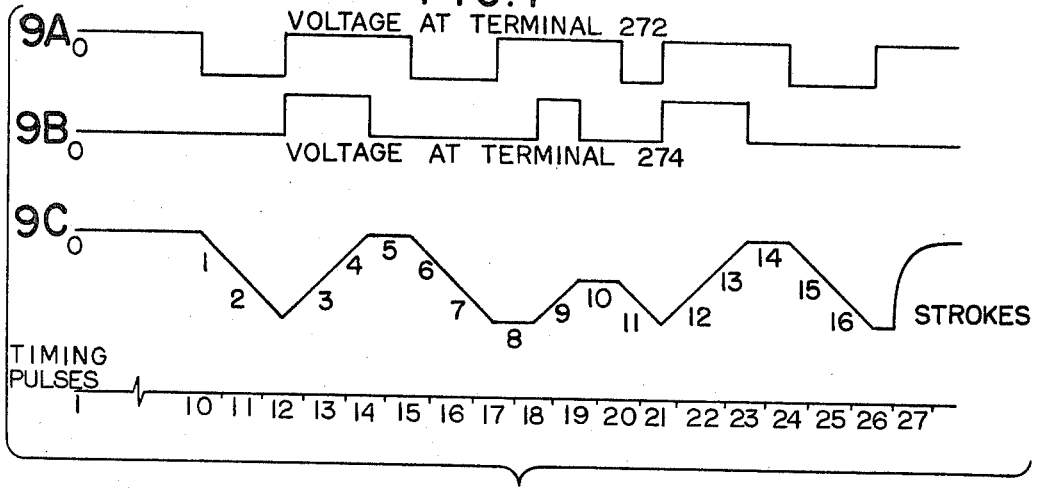
FIGURES 9a–9e show graphs of several voltages plotted as a function of time, illustrating the operation of the vertical deflection generator of FIGURE 6.

Referring again to FIGURE 6, the vertical deflection generator 48 is constructed in the same manner as the horizontal deflection generator 46. However, all the strokes of the FIGURE 2 pattern that involve vertical deflection have vertical components of the same length. Accordingly, only one positive ramp voltage and one negative ramp voltage are needed. To generate these voltages, the vertical deflection generator 46 has a gating network 270 with two output terminals 272 and 274. The input terminals of the gating network 270 are connected to the clock 91 and to the ($\phi 3$) timing signal. FIGURE 9A shows the voltage gating network 270 produces at its output terminal 272 during each cycle of the clock 91 and FIGURE 9B shows the voltage it produces at the terminal 274 during the same time.

These voltages from the gating network 270 are applied to a vertical ramp generator 276, also shown in FIGURE 6, having input terminals 278 and 280 and an output terminal 282.

The vertical ramp generator 276 is identical to the horizontal ramp generator 94 shown in FIGURE 8 except that the portion of the circuit enclosed in the dashed-line box 284 is omitted. This circuit portion is used to develop the ramp voltages having one-unit slope and is not needed in the vertical deflection generator. When the remainder of the ramp generator shown in FIGURE 8 is used in the vertical deflection generator 48, the FIGURE 8 input terminal 110 is connected to the output terminal 274 of the gating network 270 and the other FIGURE 8 input terminal 106 is connected to the gate circuit output terminal 272. FIGURE 9C shows the resultant vertical deflection voltage the ramp generator develops in response to the input voltages shown in FIGURES 9A and 9B.

With further reference to the deflection subsystem 28 shown in FIGURE 1, as noted above, the ramp voltages of FIGURES 7E and 9C, from the deflection generators 46 and 48, are applied to the summing networks and deflection amplifiers 44 and 42, respectively, together with the position voltages from the character position circuit 40. The deflector 16 of the cathode ray tube 10 receives the combined output voltages. During each cycle of the FIGURE 4 clock 91, the tube 10 traces on its screen 14 those strokes of the pattern 18 (FIGURE 2) whose ramp voltages coincide with unblanking of the electron beam in the tube.

The unblanking subsystem 30 of FIGURE 1 will now be described, starting with reference to FIGURE 10, which shows at the top the register 38 that stores the binary number identifying the character being displayed. The register applies the binary digits stored therein to the decoder 52, which has an output character line 286 for each character the system can display. Each character line is identified with the numeral 286 followed by the designation of the character associated with it. Thus, the decoder energizes the character line 286–X when it receives the binary representation of the character X.

The unblanking encoder 54 of FIGURE 1 comprises two sets of gates, a clocking gate network described below with reference to FIGURES 11, 12 and 13 and a stroke gate network 288 shown in FIGURE 10. The stroke gate network 288 includes an OR circuit 290 for each of the thirteen full strokes required to form the stroke pattern 18 of FIGURE 2. Thus, there is an OR circuit 290–1 associated with stroke 1 of the character pattern and a stroke 2 OR circuit 290–2, etc. There are no OR circuits for strokes that duplicate other strokes, i.e. for strokes 9, 11 and 14. In addition to the OR circuits associated with the thirteen full strokes in the pattern 18, the stroke gate network 288 also has an OR circuit 290 for each of the following half strokes: 5F, 5L, 8F, 8L, 10F, 10L and 12L.

Reference to Tables I and II shows that the stroke gate network 288 thus has an OR circuit 290 for each full stroke and for each half stroke used to form the characters listed in these charts with the exception of strokes 1L, 2F, 7L, 15L, 16F and 16L. Each of these strokes is used in forming only one character and, as will become apparent from the following discussion, does not require the OR operation performed by the stroke gate network 288.

Figure 10:
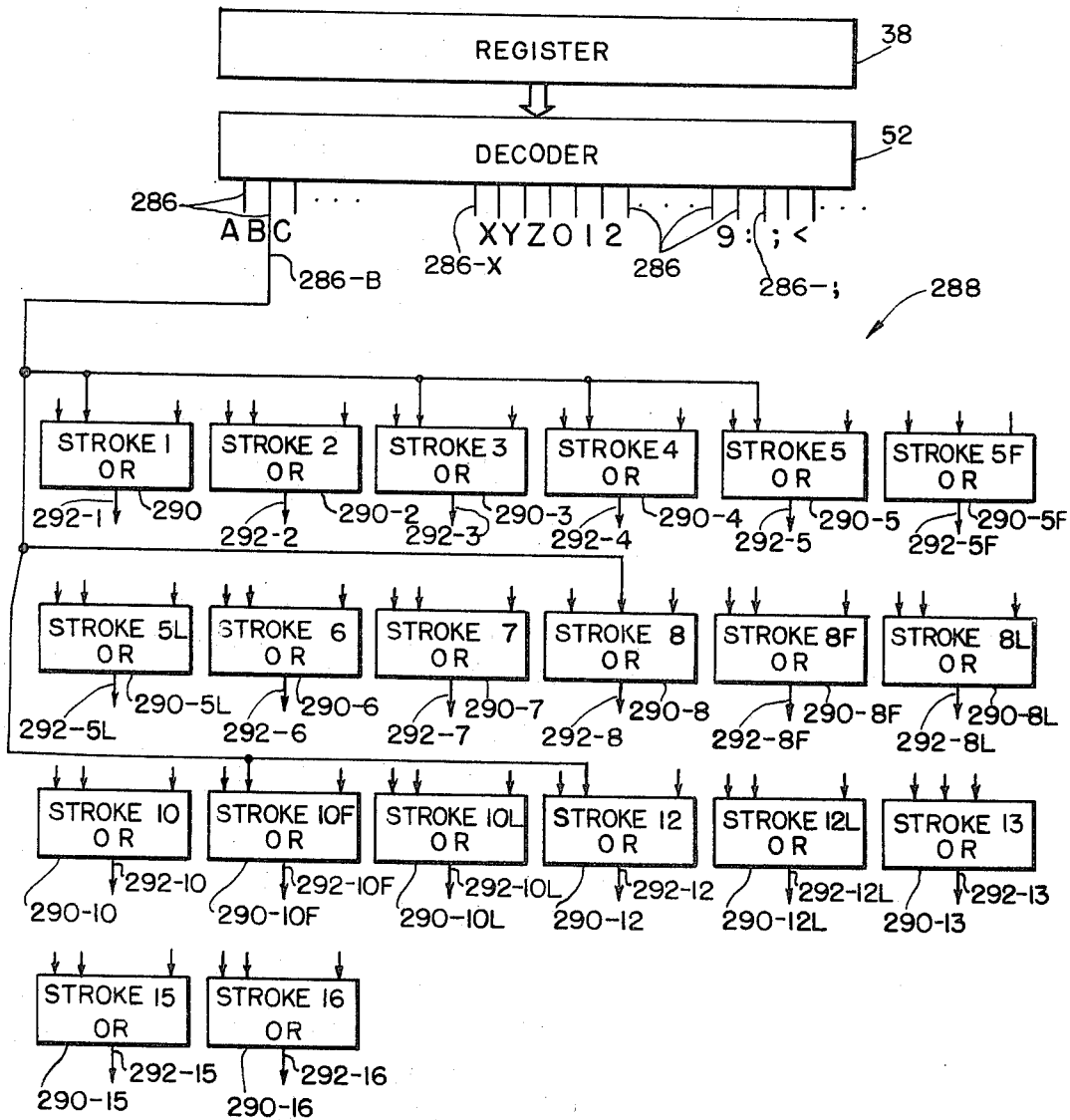
FIGURE 10 shows coding circuits used in generating the unblanking signals for the display system of FIGURE 1.

As also shown in FIGURE 10, each OR circuit 290 has a plurality of input terminals and a single output terminal 292. Each character line 286 output from the decoder 52 is connected to an input terminal of every OR circuit 290 associated with a stroke required for forming the corresponding character. For simplicity, only the connections for the character line 286–B are shown. As listed in Table I, the character B is formed with strokes 1, 3, 4, 5, 8, 10F and 12. Accordingly, the character line 286–B from the decoder 52 connects to an input terminal of the stroke 1 or circuit 290–1, to an input terminal of the stroke 3 OR circuit 290–3, and to an input terminal on each of the OR circuits 290–4, 290–5, 290–8, 290–10F and 290–12. Hence, when the register 38 stores the binary number designating the character B, the decoder 52 energizes the character line 286–B and the stroke 1, 3, 4, 5, 8, 10F and 12 OR circuits develop stroke signals at their output terminals 292. These stroke signals persist for as long as the register 38 holds the number identifying character B.

The other character lines 286 are connected to OR circuits in the stroke gate network 288 according to the same logical scheme.

Figure 11:
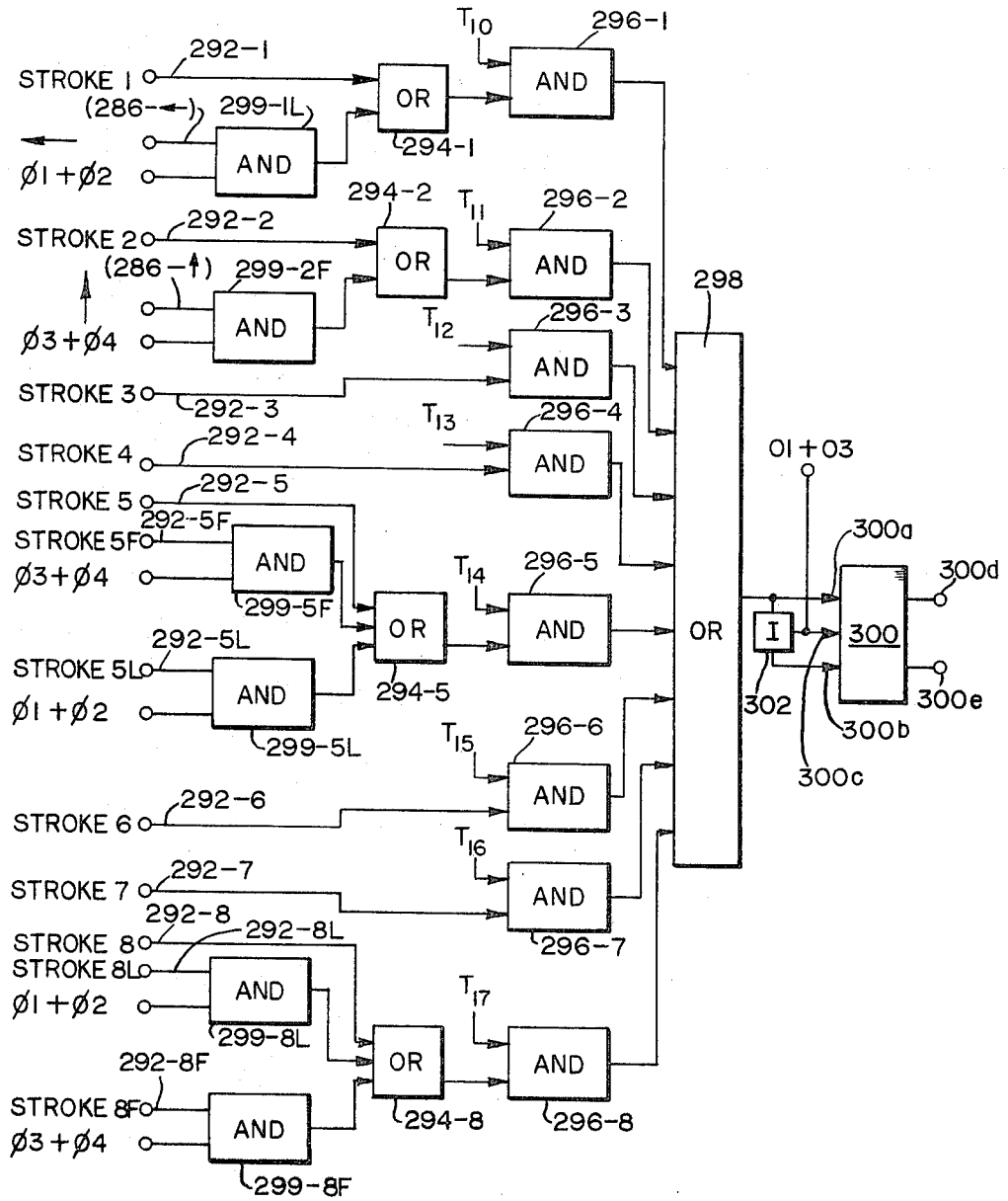
FIGURES 11, 12 and 13 are schematic diagrams of gating circuits operated with the coding circuits of FIGURE 10.
Figure 12:
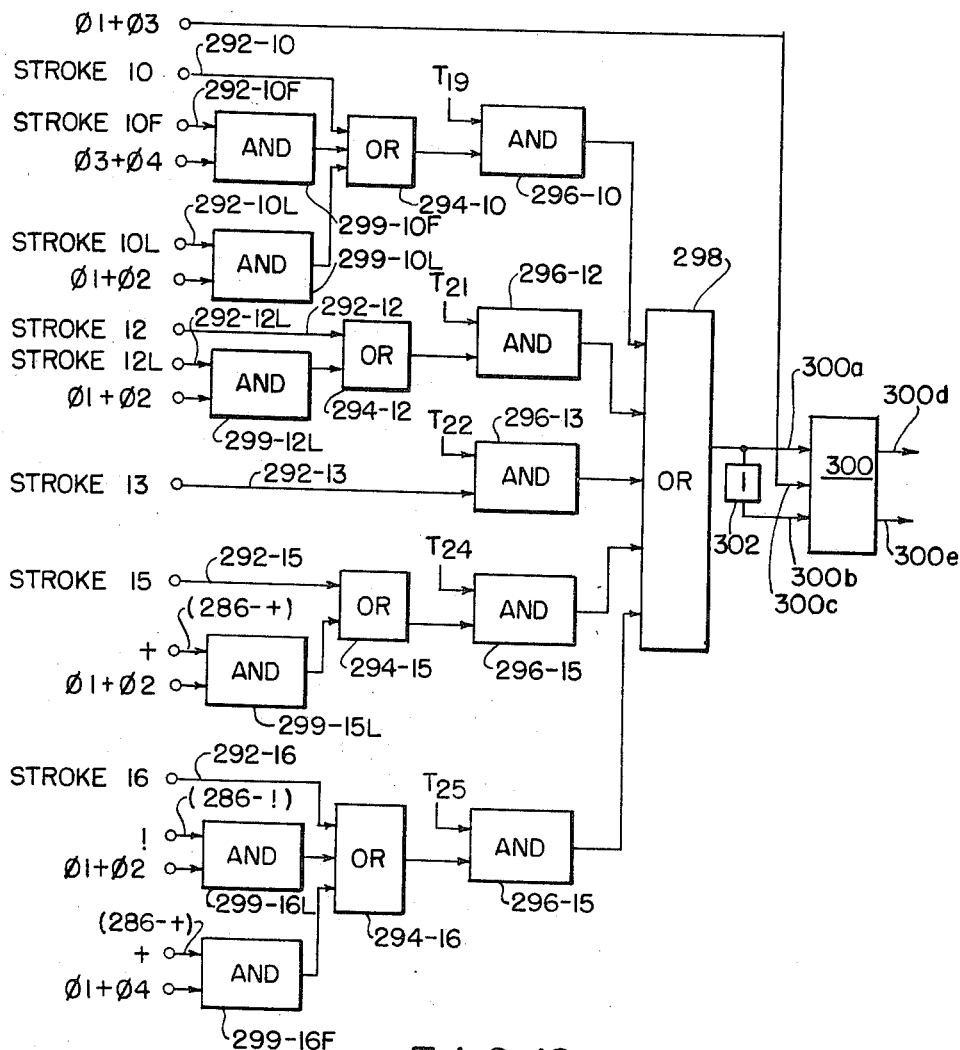
Figure 13:
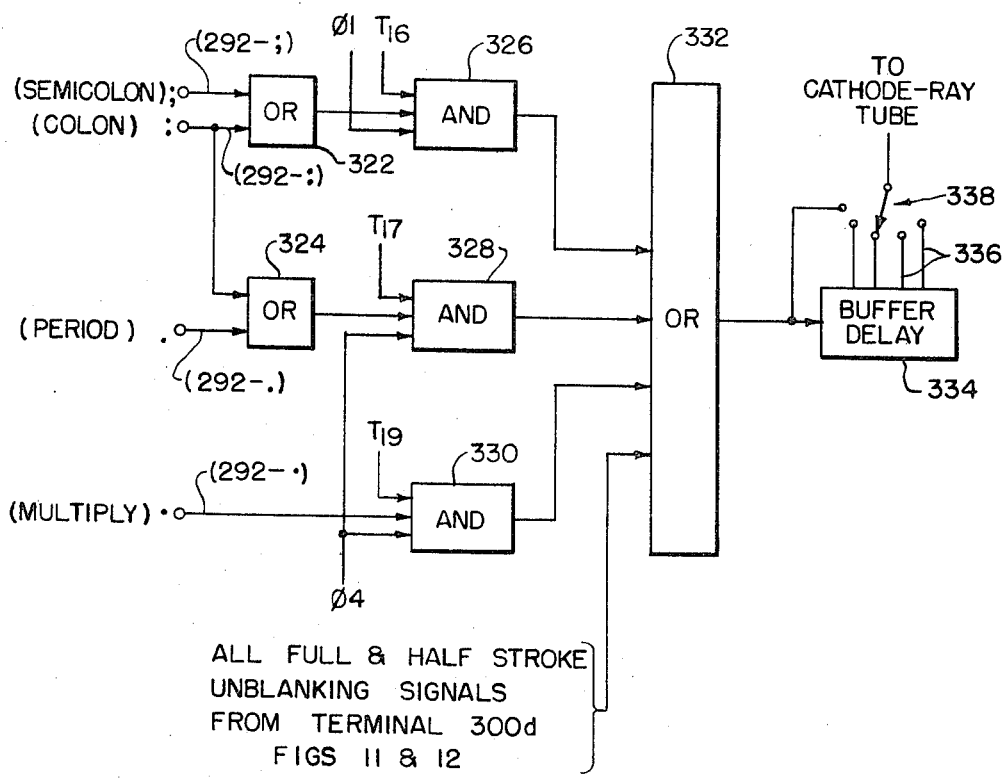

FIGURES 11, 12 and 13 show the clocking gate network of the encoder 54, FIGURE 1, As will now be described, these gates convert the stroke signals from the FIGURE 10 stroke gate network 288 to a single sequence of unblanking pulses. Each unblanking pulse is used to display one particular stroke of the character pattern. Accordingly, the timing of each pulse in the unblanking sequence corresponds precisely to the timing in the sequence of deflection voltages of the particular ramp voltages for producing the corresponding stroke.

More specifically, as shown in FIGURE 11, the output terminal 292–1 from the FIGURE 10 OR circuit 290–1 is applied to an OR circuit 294–1 whose input terminal is connected to an input terminal of an AND circuit 296–1. The other input terminal of the AND circuit 296–1 receives the $T_{10}$ pulse, which occurs during the interval ramp voltages for stroke 1 begin (see FIGURES 7E and 9C).

The output terminal from the AND circuit 296–1 is applied to an OR circuit 298. A bistable circuit 300 that has input terminals 300a and 300b, a switching terminal 300c, a ONE output terminal 300d and a ZERO output terminal 300e, receives the OR circuit output signal at its input terminal 300a. An inverter 302 applies the complement of the OR circuit output signal to the terminal 300b.

The input signal at the switching terminal 300c is the ($\phi 1$ & $\phi 3$) timing signal (FIGURE 5H) developed in the FIGURE 1 timing unit 50.

The bistable circuit 300 comprises a flip flop whose output terminals are the terminals 300d and 300e. The flip flop input terminals are connected through gates to the switching terminal 300c. The gates, in turn, are conditioned with the signals applied to the input terminals 300a and 300b. Specifically, when the input terminal 300a is ground and the terminal 300b is positive, the gates of the bistable circuit are conditioned to apply the switching signal from the terminal 300c to switch the flip flop to the ONE state. This occurs in response to the negative transition, i.e. leading edge, of the ($\phi 1 + \phi 3$) signal.

Similarly, when the input terminal 300b is at ground and the input terminal 300a is positive, the negative transition switches the bistable circuit 300 to the ZERO state.

With further reference to FIGURE 11, assume for simplicity that the output signals from the AND and OR circuits have the same polarities as the input signals that produce them, i.e. that there is no inversion in these gate circuits. The terminal 292–1 from the stroke gate network 288, FIGURE 10, becomes positive when the register 38 stores a number identifying a character using stroke 1 of the stroke pattern. Assuming that this number is loaded into the register in response to the $T_1$ pulse from the FIGURE 4 clock 91 and is not cleared out of the register until the end of the clock's 27-microsecond period, the voltage at the terminal 292–1 has the waveform 304 shown in FIGURE 14.

Figure 14:
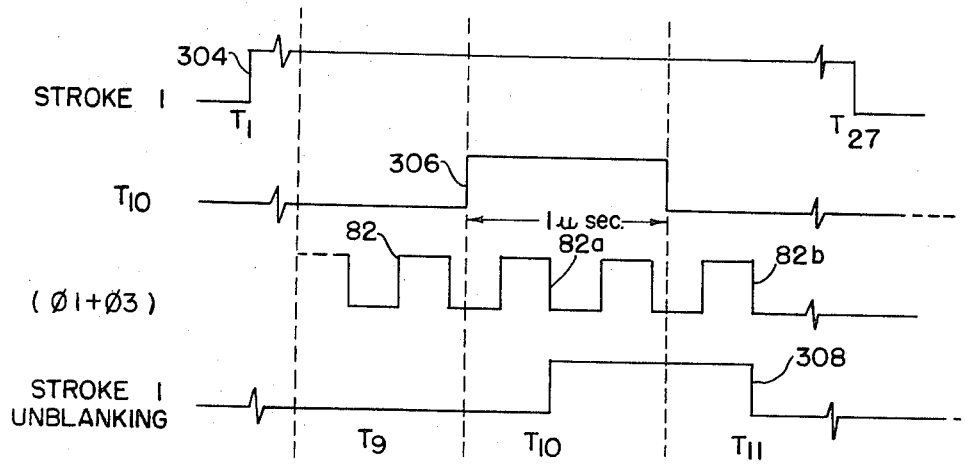
FIGURES 14, 15, 16 and 17 show graphs of voltage plotted as a function of time, illustrating the operation of the unblanking circuits in the display system of FIGURE 1.

This signal passes through the OR circuit 294–1 and enables the AND circuit 296–1. The AND circuit 296–1 then produces an output signal when it receives the pulse $T_{10}$. The FIGURE 14 waveform 306 represents the $T_{10}$ pulse input to the AND circuit, as well as the resultant stroke 1 signal from it. The waveform 82 of the ($\phi 1 + \phi 3$) signal (FIGURE 5H) is also shown in FIGURE 14.

The OR circuit 298 applies the $T_{10}$ pulse from the AND circuit 296 to the bistable circuit input terminal 300a and to the inverter 302. The terminal 300a of the bistable circuit 300 is thus positive and the terminal 300b at ground during the one-microsecond interval of the $T_{10}$ pulse. Accordingly, the bistable circuit switches to the ZERO state at the negative transition 82a (FIGURE 14) of the ($\phi 1+\phi 3$) signal applied to its switching terminal 300c. The voltage at the terminal 300d accordingly becomes positive at essentially the middle of the $T_{10}$ pulse, as shown in the waveform 308 of FIGURE 14.

Assuming there is no signal at the terminal 292-2, the output of the OR circuit 298 will drop to zero at the end of the pulse $T_{10}$. The polarities at the input terminals of the bistable circuit 300 are thus reversed and the circuit 300 thus switches back to the ONE state at the negative transition 82b, FIGURE 14, of the ($\phi 1+\phi 3$) signal. The output voltage at the terminal 300d of the bistable circuit accordingly is positive only during the one-microsecond period from the middle of $T_{10}$ to the middle of $T_{11}$ as illustrated by curve 308 (FIGURE 14). Thus the unblanking signal turns on the beam of the cathode ray tube during exactly the interval that stroke 1 of the stroke pattern is generated (FIGURES 7E and 9C).

With further reference to FIGURE 11, the OR circuit 294-1 also receives the output signal from an AND circuit 299-1L that receives the ($\phi 1+\phi 2$) timing signal from the timing unit 50 (FIGURE 4) and the decoder character line (286-←), which is energized when the register 38 (FIGURE 10) stores the number identifying the left-going arrow character (←). Reference to Table II shows that this character is formed with stroke 1L. Tables I and II also reveal that no other character uses this particular half-stroke. Accordingly, the character line (286-←) from the decoder 52 is applied directly to the clocking gate network, rather than to the stroke gate network 288 of FIGURE 10.

Figure 15:
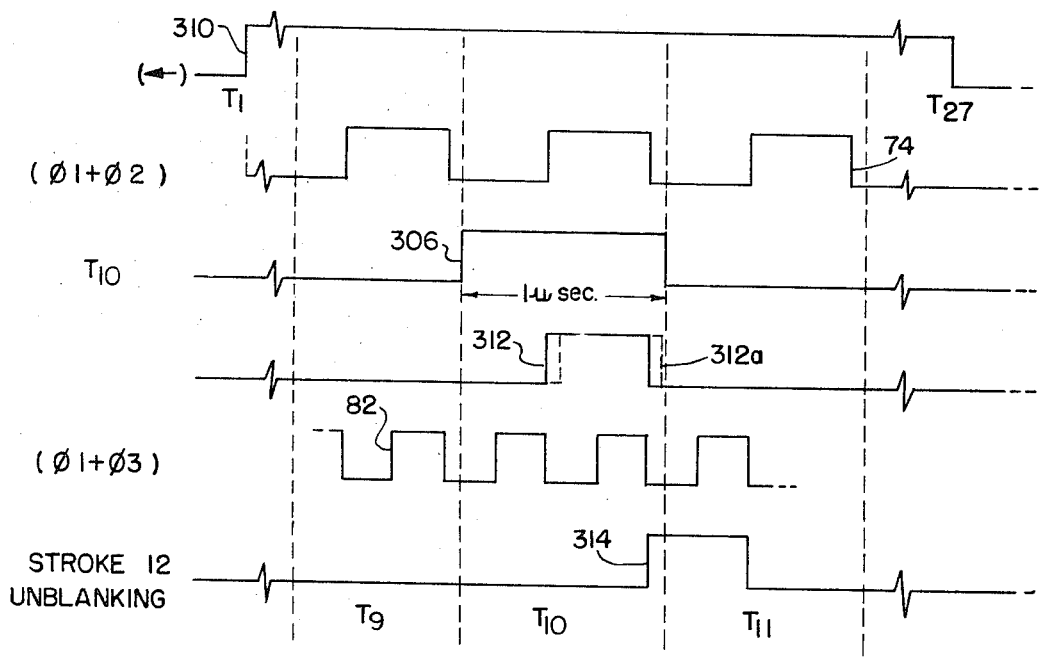

When the coded representation of the character (←) is in the register 38 (FIGURE 1) throughout one clock cycle, the signal of the output line (286-←) of the decoder 52 (FIGURE 10) has the waveform 310 shown in FIGURE 15. This level enables the AND circuit 299-1L and hence it passes the ($\phi 1+\phi 2$) timing signal to the OR circuit 294-1 for the 27-microsecond period. The output signal from the AND circuit 299-1L is then gated in the AND circuit 296-1 by the $T_{10}$ pulse (waveform 306). The output signal from the AND circuit 296-1 thus consists of that portion of the ($\phi 1+\phi 2$) waveform 74 present during the one-microsecond interval of the timing pulse. As shown by the waveform 312, the output signal from the AND circuit 296-1 accordingly is zero at all times except during the one-half microsecond interval starting just prior to the middle of the $T_{10}$ pulse. When this stroke 1L signal, waveform 312, is reclocked in the bistable circuit 300 with the ($\phi 1+\phi 3$) signal, waveform 82, the bistable circuit 300 is switched from the ONE state to the ZERO state just prior to the end of the $T_{10}$ pulse. A half-microsecond later it is switched back to the ONE state. The resulting voltage at its output terminal 300d, which is the stroke 1L unblanking signal, is shown in FIGURE 15 with waveform 314. In this connection it should be noted that the gates in the bistable circuit 300 undergo a delay in becoming enabled and disabled following the imposition of the corresponding control levels thereto. Thus the waveform 312a of FIGURE 15, delayed from the corresponding waveform 312 of the enabling level, shows the interval during which the terminal 300a is enabled and the terminal 300b is disabled.

As also shown in FIGURE 11, the signal for unblanking the electron beam to display stroke 2 of the character pattern is produced by applying a signal on the stroke 2 line 292-2, through an OR circuit 294-2, to an AND circuit 296-2 that also receives the $T_{11}$ pulse. The resultant one-microsecond signal from the AND circuit 296-2 is reclocked with the bistable circuit 300 in the same manner as described above for the stroke 1 unblanking signal.

Figure 16:
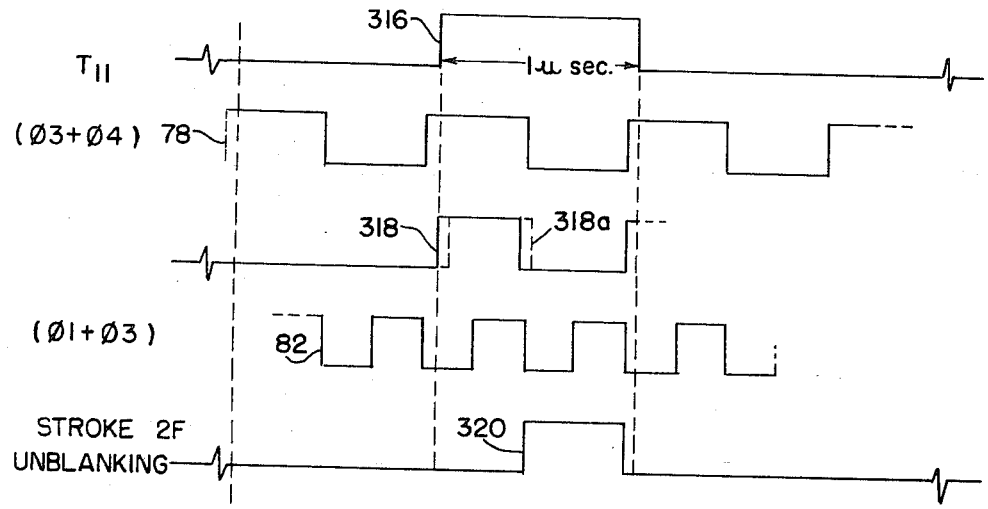

Stroke 2F of the character pattern is only displayed to form the upright arrow character (↑). Accordingly, as shown in FIGURE 11, the signal on the decoder character line (286-↑) is applied to an AND circuit 299-2F to gate the ($\phi 3+\phi 4$) timing signal to the AND circuit 296-2 by way of the OR circuit 294-2. Waveform 78 in FIGURE 16 represents the ($\phi 3+\phi 4$) signal applied to the AND circuit 296-2, and waveform 316 represents the $T_{11}$ pulse applied to it. In response to these two signals, the AND circuit 296-2 produces a stroke 2F signal having the waveform 318. Again, the waveform 318a indicates the corresponding enabling and disabling of the gates in the bistable circuit 300. In response to this signal and the ($\phi 1+\phi 3$) timing signal (waveform 82), the bistable circuit 300 produces the stroke 2F unblanking signal having the waveform 320. This signal is a half-microsecond pulse that starts just prior to the middle of $T_{10}$.

Turning to FIGURE 12, the unblanking signals for strokes 15 and 15L are produced in exactly the same manner as for strokes 1 and 1L, with an OR circuit 294-15, an AND circuit 296-15, and an AND circuit 299-15L. The stroke 15L signal is used only to display the plus sign character (+), and hence the AND circuit 299-15L connects to the decoder character line (286-+). The OR circuit 298, bistable circuit 300, and the inverter 302 of FIGURE 11 are duplicated in FIGURE 12. The AND circuit 296-15 is connected to the OR circuit 298 to reclock the stroke 15 and the stroke 15L unblanking pulses.

Similarly, strokes 12 and 12L are unblanked with signals produced, as shown in FIGURE 12, with an AND circuit 299-12L that receives the stroke 12L line 292-12L from the FIGURE 10 stroke gate network 288 and the ($\phi 1+\phi 2$) timing signal. An OR circuit 294-12 connects to the output of the AND circuit 299-12L and to the stroke 12 line 292-12; its output terminal is connected to an AND circuit 296-12 that connects to the OR circuit 298.

As shown also in FIGURES 11 and 12, the signals for unblanking the electron beam of the cathode ray tube to display strokes 3, 4, 6, 7 and 13 of the character pattern are produced by applying each signal on the decoder lines 292-3, 292-4, 292-6, 292-7 and 292-13 and the corresponding timing pulses to a separate AND circuit 296. The output terminal of each AND circuit is applied to an input terminal of the OR circuit 298, in the same manner as described above for AND circuits 296-1 and 296-2.

The foregoing gating technique is also used to produce unblanking signals for displaying strokes 5, 5F, 5L, 8, 8F, 8L, and 10, 10F, 10L and 16, 16F and 16L.

Thus, reviewing FIGURES 11 and 12, to produce the unblanking signal for each full stroke of the FIGURE 2 pattern 18, each stroke signal from the stroke gate network 288, FIGURE 10, is gated with the corresponding timing pulse in an AND circuit 296. The resultant one-microsecond pulse conditions the bistable circuit 300 to produce a one-microsecond unblanking pulse that starts just prior to the middle of the timing pulse. FIGURE 14 illustrates the waveforms involved in this operation, with the waveform 308 representing the resultant unblanking signal for stroke 1.

Further, as illustrated with the waveforms in FIGURE 16, each unblanking signal for displaying the first half of a stroke is produced by gating, also in an AND circuit 296, the ($\phi 3+\phi 4$) timing signal with the timing pulse corresponding to the timing of the particular half stroke. The ($\phi 3+\phi 4$) signal is applied to the AND circuit 296 through an AND circuit 299 enabled only in response to a stroke signal corresponding to the particular half-stroke to be displayed.

Gating a timing pulse with the ($\phi 3+\phi 4$) signal produces, in essence, a half timing pulse. This pulse conditions the bistable circuit 300 to produce a half-microsecond unblanking signal (e.g. waveform 320 of FIGURE 16) that begins at the same time as a full-stroke unblanking signal produced with the same timing pulse.

The signal for unblanking the last half of a stroke is produced in the same manner, except that the timing pulse is gated with the ($\phi 1+\phi 2$) timing signal. Waveform 314 in FIGURE 15 shows an unblanking signal produced in this manner: it is present only during the second half of the timing pulse during which a corresponding full stroke might be produced.

Thus, the several unblanking signals originate in different AND circuits 296 and are produced with different timing signals. However, they are all reclocked with the single bistable circuit 300 to synchronize them with the beam deflection signals that form the stroke pattern 18. The reclocking operation also removes various timing discrepancies resulting from differing transmission paths for the various signals, aging of components, etc.

The circuits shown in FIGURE 13 produce unblanking signals for displaying the third quarter of stroke 5, and the second quarter of each of strokes 8 and 10. These short strokes are used in forming punctuation marks, as listed in Table II. These signals are not reclocked, as are the remaining unblanking signals.

The output line (286–:) of the decoder 52 (FIGURES 1 and 10) for the colon character is applied to an OR circuit 322 and to an OR circuit 324. The OR circuit 322 also receives the decoder character line (286–;) associated with the semicolon, and the OR circuit 324 in addition receives the character line 286–.) associated with the period. An AND circuit 326 connects to the output of the OR circuit 322, and is further connected to receive the $T_{15}$ pulse and the ($\phi 1$) timing signal. These two timing signals input to the AND circuit are coincident only during the first quarter of $T_{15}$, when the third quarter of stroke 5 is being traced. Hence, when either the colon character line (292–:) or the semicolon character line (292–;) is activated, the AND circuit 326 develops an output signal during this quarter-microsecond interval.

The output terminal of the OR circuit 324 is likewise combined with the $T_{17}$ pulse and the ($\phi 4$) timing signal in an AND circuit 328. Accordingly, when either character line input to the OR circuit 324 is energized, the AND circuit 328 produces a one-quarter microsecond output signal during the last quarter of $T_{17}$. The deflection signals for tracing the second quarter of stroke 8 are generated at this interval. When the colon character line is energized, both AND circuits 326 and 328 develop quarter-microsecond pulses to unblank two "dots" as required to form a colon.

When the decoder output line (202–.) is active, an AND circuit 330 to which the line connects and which also receives the ($\phi 4$) timing signal produces a one-quarter microsecond signal during the last quarter of $T_{19}$, when the second quarter of stroke 10 is traced.

As also shown in FIGURE 13, the three quarter-stroke unblanking signals and all the full stroke and half stroke unblanking signals from the reclocking bistable circuit 300 (FIGURES 11 and 12) are applied to an OR circuit 332. The output from the OR circuit is connected to a delay circuit 334 that applies its input signal to different output lines 336 after different delays of fractions of a half-microsecond. One output line from the delay circuit 334, conveniently selected with a switch 338, is connected to the unblanking amplifier 56 of FIGURE 1. The output from the amplifier is applied to the electron gun 12 of the cathode ray tube to unblank the electron beam. The delay circuit enhances the synchronization of the unblanking signals with the deflection signals.

The overall operation of the unblanking subsystem 30 (FIGURE 1) just described can be summarized by assuming that the coded designation of the character B is stored in the register 38. The decoder 52 (FIGURE 10) then energizes its output lines 286–1, 286–3, 286–4, 286–5, 286–8, 286–10F and 286–12; the remaining lines 286 remain quiescent, i.e. at ground voltage. The stroke gate network 288 accordingly produces the strokes 1, 3, 4, 5, 8, 10F and 12 signals by energizing the output lines 292–1, 292–3, 292–4, 292–5, 292–8, 292–10F and 292–12. In response to these stroke signals, the circuits shown in FIGURES 11 and 12 produce the following unblanking signals starting at the middle of the corresponding timing pulses:

| | Stroke |
|---|---|
| $T_{10}$ | 1 |
| $T_{12}$ | 3 |
| $T_{13}$ | 4 |
| $T_{14}$ | 5 |
| $T_{17}$ | 8 |
| $T_{19}$ | 10F |
| and | |
| $T_{21}$ | 12 |

Figure 17:
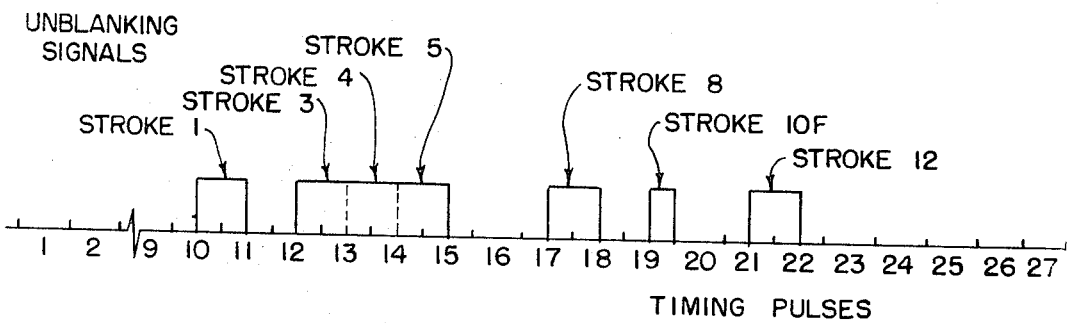

After being reclocked and applied to the FIGURE 13 OR circuit 332 and delay circuit 334, these unblanking signals form the unblanking wavetrain shown in FIGURE 17. The unblanking amplifier applies the amplified wavetrain to the cathode ray tube to turn the electron beam on at precisely the times that the deflection subsystem 28 is tracing strokes 1, 3, 4, 5, 8, 10F and 12 of the stroke pattern. The resultant display on the tube screen 14 is the character B in the form shown in FIGURE 3A.

A further feature of the invention permits the characters to be displayed with the vertical strokes being either entirely vertical as in FIGURE 3 or having a horizontal slant. This slanting of the characters is achieved by offsetting the horizontal deflection voltage with a portion of the vertical deflection voltage.

Figure 18:
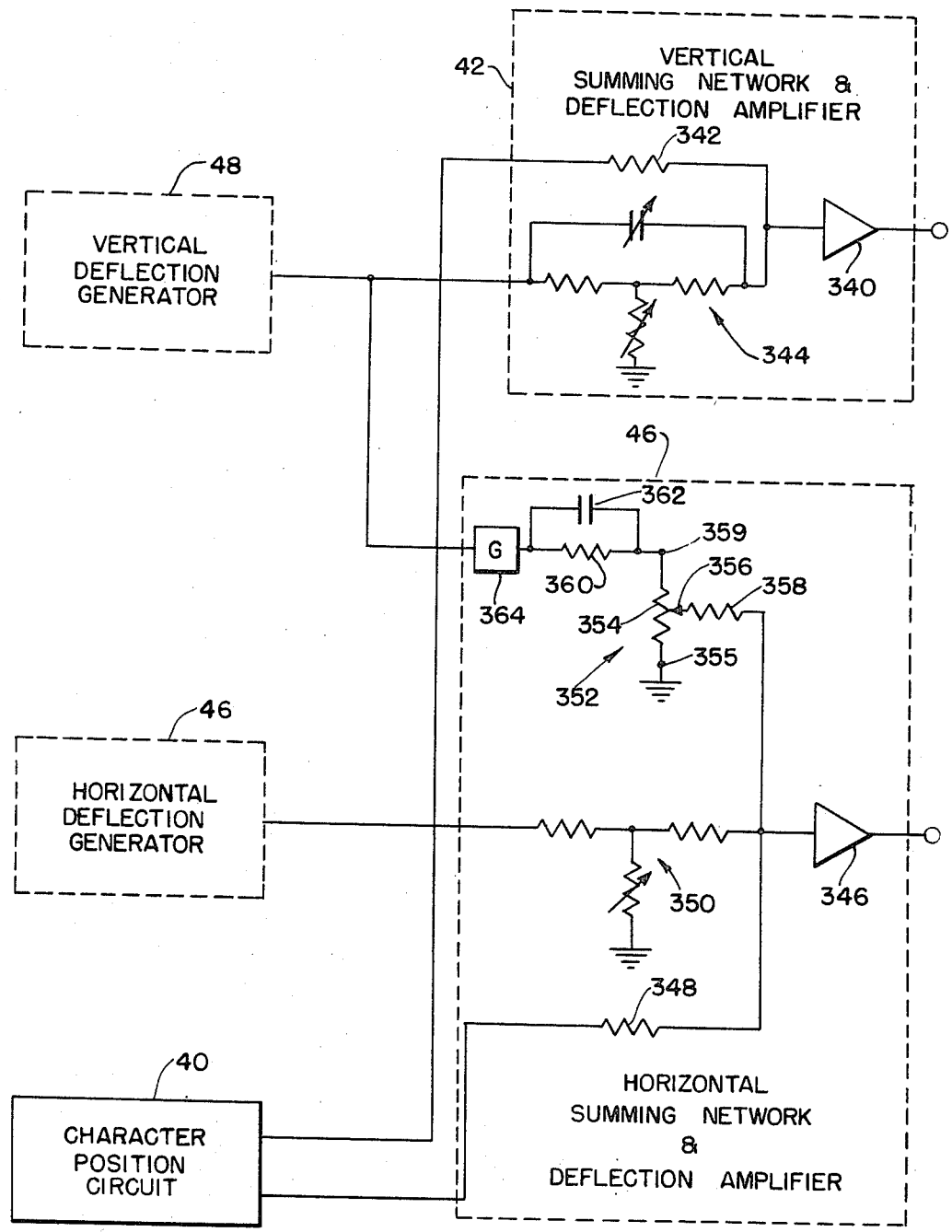
FIGURE 18 shows a circuit for changing the horizontal deflection voltage to cause the characters to be displayed with an adjustable horizontal slant.

Specifically, referring to FIGURE 18, the vertical summing network and deflection amplifier 42 comprises an amplifier stage 340 whose input signal is the vertical position voltage from the character position circuit 40 plus the vertical deflection voltage, shown in FIGURE 9C, produced in the vertical deflection generator 48. The position voltage is applied to the amplifier stage 340 through a resistor 342, and a T-attenuator 344 applies a portion of the deflection voltage to the amplifier stage. The attenuator 344 can be adjusted to change the vertical dimension of the displayed characters.

The horizontal summing network and deflection amplifier 46 likewise applies the horizontal position voltage from the position circuit 40 to an amplifier stage 346 through a resistor 348. A variable T-attenuator 350 applies a portion of the horizontal deflection voltage (FIGURE 7E) to the amplifier stage. Adjustment of the attenuator 350 controls the widths of the displayed characters.

In addition, the horizontal summing network has an attenuator 352 that receives the vertical deflection voltage from the vertical generator 48.

Figure 19:
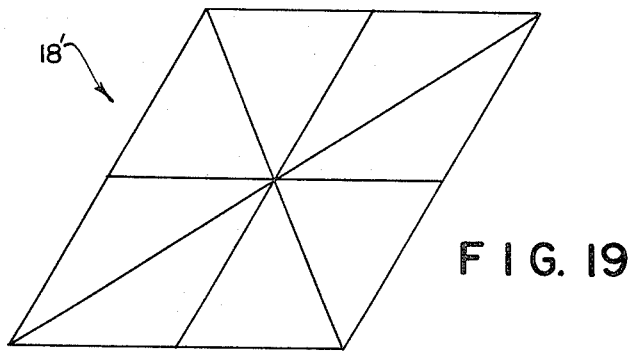
FIGURE 19 illustrates the slanted stroke pattern produced with the circuit of FIGURE 18.

In response to the resultant voltage from the amplifier stage 346, the cathode ray tube deflector 16, FIGURE 1, produces an inclined stroke pattern 18' illustrated in FIGURE 19. Each character is then similarly slanted. Many operators of the display equipment find the slanted characters easier to read than characters having all the vertical strokes fully upright.

With further reference to FIGURE 18, the attenuator 352 comprises a variable voltage divider 354 having one end terminal 355 connected to ground and having a movable tap 356 connected through a resistor 358 to the amplifier stage 346. The parallel combination of a resistor 360 and a high frequency by-pass capacitor 362 is connected between the other end terminal 359 of the voltage divider and the output terminal of the vertical character generator 48. The voltage divider tap 356 receives essentially no vertical deflection voltage when it is moved to the end of the voltage divider adjacent the grounded end terminal 355. All characters are then formed fully upright. As the tap is moved to the other end terminal 359, it couples an increasing portion of the vertical deflection voltage to the amplifier stage 346, and the characters are displayed with a horizontal slant that increases with this movement of the tap.

To understand why the stroke pattern 18, FIGURE 2, is traced with a horizontal slant when the circuit of FIGURE 18 is used, consider the tracing of strokes 6 and 7. The deflection voltage from the horizontal generator 46 remains unchanged during this time and hence there ordinarily would be no horizontal deflection of the cathode ray beam. Assuming that the vertical deflection voltage is zero at the top of the pattern 18, i.e. where stroke 5 is, at the very beginning of stroke 6 the vertical deflection signal input to the horizontal amplifier stage 346 is zero. However, as the vertical deflection voltage becomes increasingly negative to trace stroke 6 and then stroke 7, the amplifier stage 346 receives a portion of the increasingly negative vertical signal and hence the display tube deflector 16 receives a negative-going horizontal signal as well as the negative-going vertical signal. This horizontal signal moves the beam sideways, causing strokes 6 and 7 to be traced with a horizontal slant. The end of stroke 7 is then horizontally displaced to the left of the start of stroke 6.

With further reference to FIGURE 18, a switch 364, illustrated as a gate circuit, can be connected between the vertical deflection generator 48 and the attenuator 352 to apply the vertical deflection voltage to the horizontal summing network only in response to an appropriate instruction signal. With this arrangement, selected characters can be displayed with the horizontal slant while the other characters are displayed fully upright. In this manner, selected characters in a text of upright characters can be emphasized or italicized.

Figure 20:
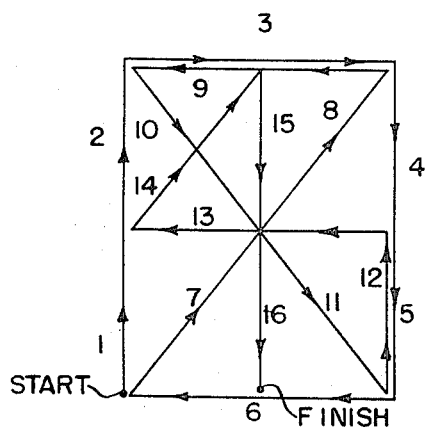
FIGURES 20 and 21 show examples of alternative stroke patterns with which the display system of FIGURE 1 can display characters.

As discussed above with reference to FIGURE 2, the illustrated stroke pattern 18 is formed with sixteen strokes, three of which retrace other strokes. Further, it has horizontal strokes traced in both directions and traced both halfway across the pattern and across the full width of the pattern. As shown in FIGURE 7E, the horizontal deflection voltage accordingly has positive ramp voltages with two different slopes and negative ramp voltages with two different slopes.

Where desired, different stroke patterns can be used, some of which simplify the deflection generators by requiring fewer deflection voltages. For example, FIGURE 20 shows an alternative sixteen-stroke pattern in which no strokes are traced from right to left halfway across the pattern. Accordingly, the pattern can be traced with a horizontal deflection generator that produces ramp voltages with only three different slopes. Also, the stroke pattern of FIGURE 20 has only two retrace strokes. Hence it has an additional "usable" stroke for forming characters.

Figure 21:
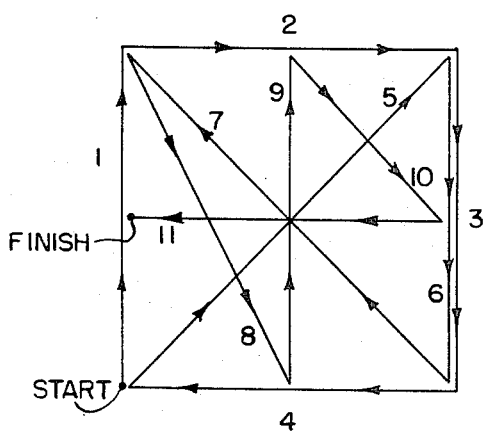

The choice of stroke pattern can also affect the unblanking subsystem. For example, the pattern shown in FIGURE 21 has the same character displaying capability as the pattern shown in FIGURE 2. However, the FIGURE 21 pattern can be traced with only eleven strokes and hence in a shorter time than the FIGURE 2 pattern.

The invention thus provides an electronic character display system wherein each character is formed by displaying selected line segments, illustrated as strokes, of the same stroke pattern. During the time each character is being displayed, the apparatus automatically develops the set of signals for forming the complete stroke pattern. Simultaneously, the apparatus produces another set of signals for displaying only those strokes that form the character to be displayed. In response to the two sets of signals, a display device forms the desired character.

The illustrated display device is a cathode ray tube. However, other display devices having movable beams that produce displays can also be used.

Each character is formed with a continuous, i.e. unbroken, trace of strokes. Also, the characters are all the same size, and like characters have the same appearance everywhere on the display screen. As a result, the display is easy to read, and operator errors and fatigue are minimized.

The beam of the illustrated display device traces the stroke pattern in response to a pair of deflection signals that have essentially no character-distorting components. Each deflection signal is produced with a ramp generator that charges a single capacitor at different rates and in different directions. Also, a single charging circuit charges the capacitor in one direction at the required different rates, and a second charging circuit provides the requisite charging in the opposite direction. By thus reducing to a practical minimum the number of components that affect the waveform of the deflection voltage, the desired waveform characteristics are readily attained with minimum character distortion. Also, savings in space and maintenance are realized.

A further feature of the invention is that the signals that select which strokes are to be displayed are synchronized with the pattern-forming deflection signals by means of a family of timing signals having different frequencies, relative phases, and duty cycles. These parameters of the timing signals are so arranged that relatively low cost and uncomplicated circuits can be used to display selected fractions of each stroke, as well as full strokes, with precise timing.

The relative ease with which fractional strokes can be displayed facilitates forming a variety of highly useful symbols other than letters and numbers. Thus, the invention makes possible a relatively low-cost character display system having an extensive character vocabulary and producing an easy-to-read text.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. Character display apparatus wherein each character is formed by displaying line segments of a multiple segment pattern common to a plurality of characters, said apparatus comprising
  (A) timing means producing
    (1) a succession of first timing signals, each of which demarks a time interval of a first duration,
    (2) a plurality of second timing signals, each second timing signal demarking a difference ($m/n$) fractional part of said first duration where ($m$) and ($n$) are positive integers with ($m$) being less than ($n$),
  (B) second means for displaying said line segments forming said pattern, said second means receiving said first timing signals from said timing means and displaying said line segments in succession with each line segment being displayed in a time corresponding to said first duration, and
  (C) third means applying display signals to said second means to cause said second means to display only line segments associated with said display signals, said third means
    (1) being connected with said timing means to receive timing signals,
    (2) developing full segment display signals in response to said first timing signals, and
    (3) developing fractional segment display signals in response to said second timing signals.

2. Character generating apparatus for producing a signal for deflecting the beam of a picture tube-type display device having a screen on which a deflectable beam forms a visible trace, said apparatus comprising
(A) a capacitor,
(B) current supply means
 (1) having a control terminal,
 (2) charging said capacitor at a substantially uniform rate determined by the amplitude of the signal applied to said control terminal,
(C) control means
 (1) connected to said control terminal
 (2) having first and second input terminals,
 (3) developing a first control signal at said control terminal in response to a signal at said first input terminal, and responding to a signal at said second input terminal to develop a second control signal having an amplitude different from that of said first control signal,
(D) timing means developing signals at said first and second input terminals according to a preselected sequence, and
(E) means producing said beam deflecting signal in response to the voltage across said capacitor.

3. Character generating apparatus according to claim 2 in which said control means comprises
(A) source means developing a supply voltage between third and fourth terminals,
(B) a first resistor connected between said third terminal and said control terminal,
(C) first switching means
 (1) connected to said first input terminal, said control terminal and said fourth terminal,
 (2) developing an essentially open circuit between said control and fourth terminals in the absence of said signal at said first input terminal,
 (3) developing a first resistance between said control and fourth terminals in response to said signal at said first input terminal, and
(D) second switching means
 (1) connected to said second input terminal, said control terminal and said fourth terminal,
 (2) developing an essentially open circuit between said control and fourth terminals in the absence of said signal at said second input terminal,
 (3) developing a second resistance between said control and fourth terminals in response to said signal at said second input terminal.

4. A character generator according to claim 3 in which each switching means comprises
(1) a transistor
 (a) having its base connected to receive said signal at said associated input terminal,
 (b) having its emitter connected with said fourth terminal, and
(2) a second resistor connected between said control terminal and the collector of said transistor.

5. Character generating apparatus for producing a voltage for deflecting the beam of a cathode ray tube type display device, said apparatus comprising
(A) a capacitor,
(B) first current supply means
 (1) having a control terminal,
 (2) connected to a first plate of said capacitor, and
 (3) charging said capacitor with positive current at a substantially uniform rate determined by the amplitude of the voltage applied to said control terminal thereof,
(C) second current supply means
 (1) having a control terminal,
 (2) connected to said first plate of said capacitor, and
 (3) charging said capacitor with negative current at a substantially uniform rate determined by the amplitude of the voltage applied to said control terminal thereof, and (D) impedance isolating means connected with said capacitor for applying the voltage across said capacitor to the deflecting circuit of a cathode ray tube.

6. In character display apparatus of the type that forms characters by displaying the constituent strokes thereof, said strokes being displayed in an ordered sequence wherein each full stroke is formed in substantially the same time duration as the other full strokes, the combination of
(A) means receiving a signal identifying a character to be displayed,
(B) means producing a signal for each full stroke in the display of said identified character,
(C) means producing a signal for each fractional stroke in the display of said identified character, each fractional stroke being formed in an integral multiple of $(1/n)$ of said duration where $n$ is a positive integer,
(D) each full stroke signal and each fractional stroke signal being produced at a time that corresponds to the time in said sequence when signals for displaying the corresponding stroke are produced, and
(E) means gating each full stroke signal and each fractional stroke signal with a continuous, periodic timing signal having a period corresponding to $(1/n)$ of said time duration.

7. In character display apparatus that displays characters one at a time by displaying the constituent line segments thereof in succession, the combination of
(A) first means producing a sequence of signals for displaying a pattern of said line segments with each full length line segment being formed in a different first interval, said pattern having line segments for forming any one of a plurality of characters,
(B) coding means
 (1) receiving signals designating characters to be displayed, and
 (2) producing a separate identifying signal for each full-length line segment and for each $(m/n)$ of a full-length line segment in the display of said designated character, where $(m)$ and $(n)$ are positive integers with $(n)$ being greater than $(m)$,
(C) timing means producing
 (1) a succession of timing pulses, each of which persists for said first interval, and
 (2) a plurality of timing signals, each of which consists of pulses identifying a $(m/n)$ portion of each first interval, and
D. gate means
 (1) gating each identifying signal for a full-length line segment with a timing pulse corresponding to the interval said first means produces said signals for displaying the corresponding line segment, and
 (2) gating each identifying signal for a fractional line segment
  (a) with a timing pulse corresponding to the interval said first means produces said signals for displaying the corresponding line segment, and
  (b) with the timing signal identifying the portion of said intervals which corresponds to the time said first means produces said signals for displaying the corresponding fractional line segment,
  (c) thereby developing a sequence of selection signals having one signal for each full-length line segment and for each fractional line segment in the display of said designated character, with the durations of said selection signals corresponding to the lengths of the associated line segments.

8. Character generating apparatus for producing a signal which deflects the beam of a picture tube type display device having a screen on which the deflectable beam forms a visible trace, said apparatus comprising:
  (A) a capacitor,
  (B) a charging circuit,
    (1) connected to said capacitor,
    (2) charging said capacitor at a uniform rate dependent upon the amplitude of a control signal applied to said charging circuit,
  (C) control means for applying a succession of control signals having different amplitudes to said charging circuit according to a preselected sequence, and
  (D) means deflecting said beam in response to the voltage across said capacitor so as to trace a pattern of successively-formed strokes.

9. Character generating apparatus as defined in claim 8 and further including intensity controlling means
  (A) receiving a signal identifying each of said characters, and
  (B) developing intensity signals that cause said apparatus to display only the strokes of said pattern required to form the identified character.

10. Character generating apparatus as defined in claim 8
  (A) wherein said succession of control signals from said control means causes said deflecting means to move said beam to trace in succession a multiple character-forming pattern of strokes in the form of a parallelogram having strokes passing diagonally between opposed corners thereof and having strokes parallel to and between each pair of parallel sides of the parallelogram, and
  (B) further including means for blanking said beam whenever said beam is retracing any strokes in said pattern.

11. Character generating apparatus as defined in claim 8 wherein said displaying device is a cathode ray tube.

12. Character generating apparatus as defined in claim 8 and further including intensity controlling means
  (A) receiving timing signals from said timing means, and
  (B) producing an intensity signal corresponding to each stroke that is to be displayed, each intensity signal having a preselected time relation with respect to the control signal associated with the corresponding stroke.

13. Character generating apparatus as defined in claim 8 wherein
  (A) each character is formed by displaying strokes of a multiple character-forming pattern common to a plurality of characters, and
  (B) said control means comprises
    (1) timing means for producing a succession of timing signals in each interval that a character is to be displayed, and
    (2) stroke selecting means
      (a) receiving at least some of said timing signals,
      (b) adapted to receive signals designating characters to be displayed, and
      (c) producing for each designated character a preselected sequence of control signals which are associated only with strokes which form the designated character.

14. Character generating apparatus as defined in claim 13 wherein
  (A) each full stroke is formed in substantially the same time duration as the other full strokes, and
  (B) said control means includes also
    (1) means for producing a signal for each full stroke in the display of the identified character,
    (2) means for producing a signal for each fractional stroke in the display of the identified character, each fractional stroke being formed in an integral multiple of $(1/n)$ of said duration where $n$ is a positive integer,
    (3) each full stroke signal and each fractional stroke signal being produced at a time which corresponds to the time in said sequence when the control signal for displaying the corresponding stroke is produced, and
    (4) means for gating each full stroke signal and each fractional stroke signal with a continuous, periodic timing signal having a period corresponding to $(1/m)$ of said time duration.

15. Character generating apparatus as defined in claim 13 wherein
  (A) said timing means produces
    (1) a succession of first timing signals, each of which demarks a time interval of a first duration, and
    (2) a plurality of second timing signals, each second signal demarking a different $(m/n)$ fractional part of said first duration where $(m)$ and $(n)$ are positive integers with $(m)$ being larger than $(n)$,
  (B) said stroke selecting means receives first timing signals from said timing means and emits control signals for tracing said strokes in succession with each stroke being displayed in a time corresponding to said first duration, and
  (C) means for applying display signals to said display device to cause said device to display only strokes associated with said display signals, said means
    (1) being connected with said timing means to receive timing signals,
    (2) developing full segment display signals in response to said first timing signals, and
    (3) developing fractional segment display signals in response to said second timing signals.

References Cited

UNITED STATES PATENTS

| | | | |
|---|---|---|---|
| 2,875,951 | 3/1959 | Schreiner. | |
| 3,205,488 | 9/1965 | Lumpkin | 315—18 X |
| 3,248,725 | 4/1966 | Low et al. | 340—324.1 |
| 3,289,196 | 11/1966 | Hull | 340—324.1 |
| 3,296,609 | 1/1967 | Wilhelmsen | 340—324.1 |
| 3,341,838 | 9/1967 | Ragen | 340—324.1 |

RODNEY D. BENNETT, *Primary Examiner.*

CHARLES L. WHITHAM, *Assistant Examiner.*

U.S. Cl. X.R.

340—324; 315—27, 29